United States Patent [19]
Davies

[11] Patent Number: 5,655,131
[45] Date of Patent: Aug. 5, 1997

[54] SIMD ARCHITECTURE FOR CONNECTION TO HOST PROCESSOR'S BUS

[75] Inventor: Daniel Davies, Palo Alto, Calif.

[73] Assignee: Xerox Corporation, Stamford, Conn.

[21] Appl. No.: 993,256

[22] Filed: Dec. 18, 1992

[51] Int. Cl.⁶ .................................................. G06F 15/00
[52] U.S. Cl. ...................... 395/800.34; 395/290
[58] Field of Search .................. 364/DIG. 1, DIG. 2; 395/800, 290

[56] References Cited

U.S. PATENT DOCUMENTS

| | | | |
|---|---|---|---|
| 3,537,074 | 10/1970 | Stokes et al. | 395/800 |
| 4,514,807 | 4/1985 | Nogi | 395/800 |
| 4,745,546 | 5/1988 | Grinberg et al. | 395/800 |
| 4,814,973 | 3/1989 | Hillis | 395/800 |
| 4,850,027 | 7/1989 | Kimmel | 382/303 |
| 4,873,626 | 10/1989 | Gifford | 395/300 |
| 4,907,148 | 3/1990 | Morton | 395/800 |
| 4,979,102 | 12/1990 | Tokuume | 395/200.05 |
| 5,038,282 | 8/1991 | Gilbert et al. | 395/200.01 |
| 5,109,333 | 4/1992 | Kubota et al. | 395/800 |
| 5,113,510 | 5/1992 | Hillis | 395/448 |
| 5,117,468 | 5/1992 | Hino et al. | 382/205 |
| 5,129,092 | 7/1992 | Wilson | 395/800 |
| 5,148,547 | 9/1992 | Kahle et al. | 395/800 |
| 5,216,522 | 6/1993 | Ishikawa | 358/448 |
| 5,230,042 | 7/1993 | Masaki et al. | 395/501 |
| 5,251,295 | 10/1993 | Ikenoue et al. | 395/504 |
| 5,268,856 | 12/1993 | Wilson | 364/748 |
| 5,325,500 | 6/1994 | Bell et al. | 395/484 |
| 5,375,080 | 12/1994 | Davies | 364/736.5 |
| 5,379,438 | 1/1995 | Bell et al. | 395/800 |
| 5,408,670 | 4/1995 | Davies | 395/800 |
| 5,428,804 | 6/1995 | Davies | 395/800 |
| 5,437,045 | 7/1995 | Davies | 395/800 |
| 5,450,603 | 9/1995 | Davies | 395/800 |
| 5,450,604 | 9/1995 | Davies | 395/800 |

FOREIGN PATENT DOCUMENTS

| | | | |
|---|---|---|---|
| 293701A2 | 12/1988 | European Pat. Off. | G06F 15/06 |
| 2225882 | 6/1990 | United Kingdom | G06F 13/36 |

OTHER PUBLICATIONS

European Search Report, EP 93 30 9997, 14 Nov. 1995.
Guttag, K., Gove, R.J., and Van Aken, J.R., "A Single–Chip Multiprocessor for Multimedia: The MVP," *IEEE Computer Graphics and Applications*, Nov. 1992, pp. 53–64.
Gwennap, L., "TI Previews High–Performance Video Engine," *Microprocessor Report*, Feb. 15, 1993, p. 14.
Fenwick, D., Redford, J., Stanley, T., and Williams, T., "A VLSI Implementation of the VAX Vector Architecture," *COMPCON 90*, Feb. 26–Mar. 2, 1990, pp. 115–119.

*Primary Examiner*—Alyssa H. Bowler
*Assistant Examiner*—John Follansbee

[57] ABSTRACT

A coprocessor includes processing units, control circuitry, and circuitry for connecting the coprocessor to a host processor. The connecting circuitry includes slave circuitry and master circuitry. The slave circuitry receives requests for coprocessor operations from the host processor's bus and provides signals to the control circuitry so that requested operations are performed. The master circuitry receives requests for data transfer operations from the control circuitry; the master circuitry requests host bus operations and also transfers data between the coprocessor and the host bus to perform requested data transfer operations. The control circuitry includes a control/status register and a control store. The slave circuitry can change data in the control/status register or transfer data from the control/status register to the host bus. The slave circuitry can also transfer data between the host bus and the control store. The master circuitry includes a bus connected to each of the processing units through a register and connected to the host bus through a pipeline of registers. The master circuitry can provide an address or data to be written to the host bus from any of the processing units, and can provide data being read from the host bus to each of a set of processing units. The master circuitry can perform single word or multi-word DMA read and write operations, and can also use the control store as a mailbox for communication with the host processor or other host bus masters. The processing units can operate on data in horizontal format so that corner turning is unnecessary.

45 Claims, 24 Drawing Sheets

SIMD ARCHITECTURE FOR CONNECTION TO HOST PROCESSOR'S BUS

BACKGROUND OF THE INVENTION

The present invention relates to parallel processors.

Wilson, U.S. Pat. No. 5,129,092 (Wilson '092), describes a single instruction multiple data (SIMD) parallel processor for processing data matrices such as images and spatially related data. As shown and described in relation to FIGS. 1 and 2, the processor includes a linear chain of neighborhood processing units with direct data communication links between adjacent processing units. A single controller sends a sequence of instructions to the processing units, so that all processing units receive the same instruction at any given cycle in the instruction sequence. Each processing unit has an associated memory that is a single bit wide, to and from which data is transferred through shift registers. Similarly, each processing unit receives data from and provides data to adjacent processing units using shift registers, which are used for data input and output as described at col. 8 line 24–col. 9 line 14.

As Wilson '092 shows and describes in relation to FIGS. 1, 2, and 5, the processing units form groups of eight, and a host computer and the controller can both send or receive data from the groups via eight bit lines referred to as data byte lines. One of these lines is coupled to an output selector within each processing unit; the output of the selector can be written into memory by enabling a three-state gate. Similarly, each processing unit can deliver data from memory to its line by enabling a three-state gate.

Wilson '092 describes transpose in and transpose out operations for transposing data between memory and an accumulator in relation to FIGS. 6A and 6B. The look-up table and histogram applications described at col. 16 line 53–col. 18 line 18 both include operations that change data between vertical and horizontal formats, as illustrated in FIGS. 6A and 6B.

Wilson, EP-A 293 701 (Wilson '701), describes another such parallel processor. The data input operation is described in relation to FIGS. 1 and 2 at page 5 col. 7 lines 22–43 and the data output operation at page 8 col. 13 lines 9–41.

Hillis, U.S. Pat. No. 5,113,510 describes techniques for operating cache memory in a multi-processor, apparently developed for use in the Connection Machine from Thinking Machines Corporation, a SIMD parallel processor. As shown and described in relation to FIG. 3, each processor in a multi-processor system is connected to a corresponding cache. When a cache memory outputs a miss signal, a bus arbitration unit provides a signal indicating that each successive cache may not perform an update while the present update is being performed, so that the first cache in the priority chain to request an update temporarily disables all other requests for update. Upon receiving a request for update, a shared memory obtains data at a specified address and outputs a Data ready signal, the address, and the data. When the address is within a specified range of addresses of interest to a cache or when the cache is the source of the request for update, the cache memory accepts and stores the address and data signals. As a result, all caches receive updated data from main memory limited only by an optional range detector. As shown and described in relation to FIG. 4, the bus arbitration circuitry can be arranged in a hierarchical tree-like configuration.

SUMMARY OF THE INVENTION

The invention deals with a basic problem in parallel processors.

A SIMD parallel processor includes processing units, each able to access its own data in memory. In contrast with a multiple instruction multiple data (MIMD) parallel processor in which each processor can execute an independent sequence of instructions, all the processing units in a SIMD parallel processor receive the same instruction stream.

SIMD parallel processors are especially useful for operations on data arrays, such as image processing. But a conventional SIMD parallel processor is not designed for efficient operation as a coprocessor connected to a host processor's bus. Some conventional SIMD parallel processors, such as those described by Wilson '092 and Wilson '701, for example, rely primarily on shift registers for data input and output, which is incompatible with receiving data from a host processor's bus. Other SIMD parallel processors provide data in horizontal format to corner turning circuitry which then provides data in vertical format to each processing unit, as described in Wilson '092. In other SIMD parallel processors, such as that described by Hillis '510, each processing unit's cache memory can access a shared memory through a bus, but it would be impractical to connect each of a large number of processing units to a host processor's memory through the host processor's bus.

The invention is based on the discovery of an architecture that alleviates this and related problems by providing circuitry so that a parallel processor, such as a SIMD parallel processor, can be both slave and master of a host processor's bus. As a result, the parallel processor can receive instructions as a slave of a host processor's bus but can become master of a host processor's bus for other purposes, such as for input and output of data to its processing units.

The architecture can be implemented as a coprocessor that can be connected to a host bus to which a host processor's central processing unit (CPU) and other components, such as memory, are also connected. The coprocessor includes a plurality of processing units. The coprocessor also includes control circuitry that controls the coprocessor and is connected to provide signals to control the processing units. Finally, the coprocessor includes host bus connecting circuitry for connecting to a host processor.

The host bus connecting circuitry includes slave circuitry and master circuitry. The slave circuitry receives signals from the host bus requesting coprocessor operations and, in response, provides signals to the coprocessor's control circuitry so that the coprocessor performs requested operations. The master circuitry receives signals from the coprocessor's control circuitry requesting data transfer operations and, in response, provides signals to the host bus requesting host bus operations and transfers data, either from the coprocessor to the host bus or from the host bus to the coprocessor, to perform requested data transfer operations.

The coprocessor architecture described above is advantageous in a number of ways.

Operations that input or output data to the processing units can be integrated into the normal operations of the coprocessor, allowing greater flexibility. For example, a block of data of any of a number of sizes can be transferred whenever required, so that data defining differently sized parts, from small to large, of a large array can be easily handled as needed for a specific coprocessor operation. Further, the transfer can be implemented so that items of data from a block of data are distributed evenly among processing units.

Flexible block sizes and the ability to evenly distribute items of data are especially important for image processing applications. Because of these features, data defining different parts of an image or images of different sizes can be provided to the processing units. For example, each processing unit can be implemented to include memory circuitry, and a respective word of data defining a pixel or a group of pixels can be loaded into each processing unit's memory circuitry. Further, the memory circuitry of each processing unit can be of sufficient size that it can store more items of data than the internal registers of the processing unit's processing circuitry, so that the memory circuitry can perform a caching function for the processing circuitry. The processing units can form a one-dimensional array, and the memory circuitry of all the processing units together can be of sufficient size to store more than one image, with each processing unit's memory circuitry storing a respective word from each horizontal image block in each image; each horizontal image block is a single row or portion of a row small enough to fit into the array of processing units in horizontal format.

The coprocessor architecture can be adapted to any of a number of bus protocols and block sizes. The slave circuitry and master circuitry for a specific bus protocol can be easily and inexpensively produced using conventional components. The coprocessor control circuitry can provide any appropriate level of complexity, and can be implemented, for example, with a control store that stores microinstructions that are executed to perform coprocessor operations. The microinstructions can be loaded from the host bus by the slave circuitry and can be appropriate to the host processor's block size.

The coprocessor architecture described above makes it unnecessary to have separate control circuitry for responding to requests for input or output operations from other masters of the host bus. Another master can load microinstructions into a control store so that the coprocessor control circuitry requests that the master circuitry perform an input or output operation.

Further, input and output operations can be performed much more efficiently by operating the coprocessor as a bus master than as a slave of another bus master. The other bus master would typically require two or more read and write operations to complete transfer of an item of data, while the coprocessor, operating as a bus master, can typically transfer an item of data with a single read or write operation.

The master circuitry can be implemented to include a common bus connected to each of the processing units through a respective register. The register can receive source select signals from the coprocessor control circuitry that indicate when it is a source of data for the common bus. Each processing unit can receive destination select signals from the control circuitry that indicate when it is in a set of processing units that are destinations for data received by its respective register. Pipeline register circuitry can also be connected between the host bus and the common bus, and can store each item of data being transferred for an appropriate number of clock cycles.

In the coprocessor architecture described above, each processing unit can be structured to handle data in horizontal format. For example, if the host bus provides items of data that are N bits wide in horizontal format, each processing unit can include one N bit microprocessor, two N/2 bit microprocessors, four N/4 bit microprocessors, or etc., with each microprocessor capable of performing operations in horizontal format on data received from the host bus in horizontal format. Because the items of data are received in horizontal format and operations are performed in horizontal format, no corner turning circuitry is necessary.

The slave circuitry can perform a number of coprocessor operations by providing signals to the coprocessor control circuitry. For example, if the coprocessor control circuitry includes a status register, the slave circuitry can change data in the status register in response to signals from the host bus or can transfer data from the status register to the host bus. Or if the coprocessor control circuitry includes a control store, the slave circuitry can transfer data from the host bus to the control store and from the control store to the host bus.

The data in the control store can include encoded instructions and the coprocessor control circuitry can include decode circuitry for decoding encoded instructions to obtain items of instruction data indicating instructions to be executed by the processing circuitry of the processing units. The decode circuitry can be connected to provide items of instruction data to the instruction circuitry.

The data in the control store can also include encoded master requests. The decode circuitry can decode encoded master requests to obtain items of request data indicating requests for operations by the master circuitry. The decode circuitry can be connected to provide items of request data to the master circuitry.

The items of request data can include items requesting transfer of data from a processing unit to the control store or from the control store to a set of processing units. This makes it possible for the master circuitry to control its own operation by loading instructions into the control store. Also, the control store can be used as a mailbox through which the master circuitry can communicate with other bus masters, such as the host processor's CPU.

The following description, the drawings, and the claims further set forth these and other aspects, objects, features, and advantages of the invention.

DETAILED DESCRIPTION

A. Conceptual Framework

Figure 1:
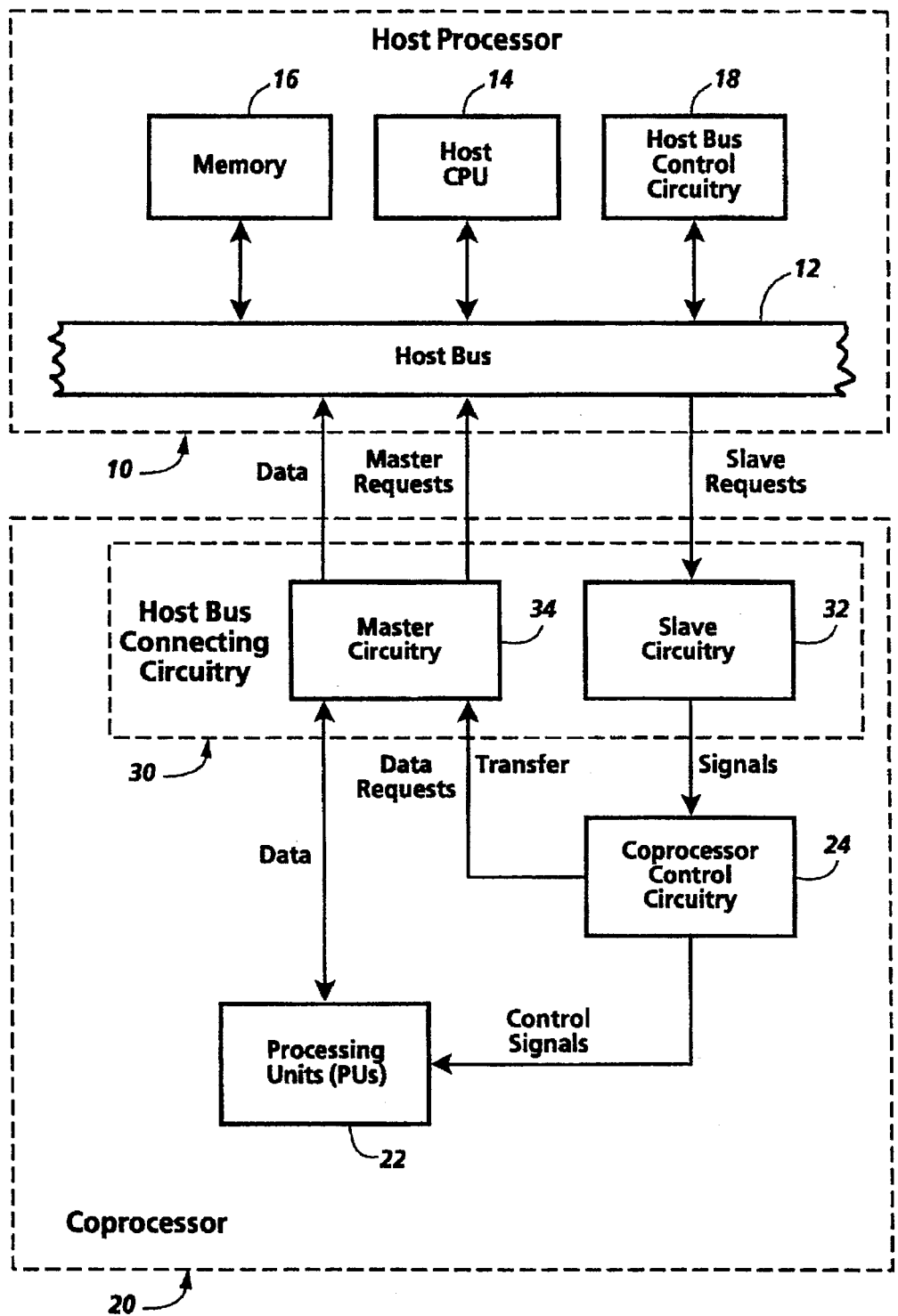
FIG. 1 is a schematic block diagram showing general components of a parallel processor that can be connected as a coprocessor to a host processor's bus.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored are different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

A processor performs an operation "in horizontal format" on an item of data that includes more than one bit when the operation is performed on all the bits in the item of data at once.

A "block" of items of data is a number of items of data that form a sequence.

A processor or other component of circuitry "uses" an item of data in performing an operation when the result of the operation depends on the value of the item. For example, the operation could perform a logical or numerical operation on the item or could use the item to access another item of data.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An operation "encodes" items of data when performing the operation on the items of data produces different items of data from which the encoded data items can subsequently be recovered. The operation that recovers the encoded data items is "decoding."

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A first component provides a signal to a plurality of other components "in parallel" when all of the other components receive the signal from the first component at approximately the same time.

An operation or component can provide or transfer an item of data to a single receiving component "in parallel" if the item of data includes a plurality of bits and the receiving component receives all of the bits at approximately the same time.

A signal "requests" or "is a request for" an event or state when the signal can cause occurrence of the event or state.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

A first component "controls" a second component when signals from the first component determine how the second component operates.

A signal from control circuitry "indicates" or "selects" a subset of a set of components when the signal determines that an operation affects components in the subset differently than it affects other components in the set. For example, a signal can indicate one of a set of components as a source of data or can indicate a subset of the set of components as destinations of data.

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

The terms "coprocessor" and "host processor" are complementary terms. A "host processor" is capable of operating independently but it can also be connected to a "coprocessor" so that the host processor and the coprocessor operate in an interdependent manner.

"Connecting circuitry" is circuitry that connects two or more components.

"Interconnecting circuitry" is circuitry that interconnects a plurality of components. The components are interconnected "into an array" by interconnecting circuitry that permits transfer of data to and from a component that can be mapped to a given position in an array only through connections to other components that can be mapped to adjacent positions in the array. The array is "one-dimensional" if each component has at most two adjacent components, so that the components together can be mapped onto a line according to their interconnections.

"Bus circuitry" or a "bus" is circuitry connecting a plurality of components, at least one of which is a "source" and at least one of which is a "destination," such that the bus circuitry is capable of transferring a signal provided by any of the sources to all of the destinations. Some devices connected to bus circuitry can act either as sources or destinations.

A bus receives, transfers, or provides an item of data that includes more than one bit "in horizontal format" if the bits of the item are received, transferred, or provided at approximately the same time.

"Slave circuitry" is circuitry that can be connected to receive signals requesting operations from a bus and to perform requested operations, either by performing the operations itself or by providing signals to other components so that the other components perform the operations.

"Master circuitry" is circuitry that can be connected to provide signals requesting operations to a bus. For example, master circuitry could provide signals requesting control of the bus or could provide signals to the bus requesting an operation by slave circuitry connected to the bus.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

A "parallel processor" is a processor that includes more than one processing unit, each able to perform operations on data in parallel with the others.

An operation "evenly distributes" items of data among a plurality of processing units when the maximum difference between the number of items of data received by any pair of the processing units is one.

B. General Features

Figure 2A:
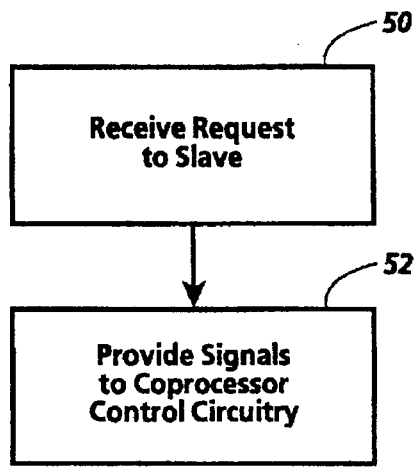
FIG. 2A is a flow chart showing general acts in which slave circuitry as in FIG. 1 responds to a request for a coprocessor operation.
Figure 2B:
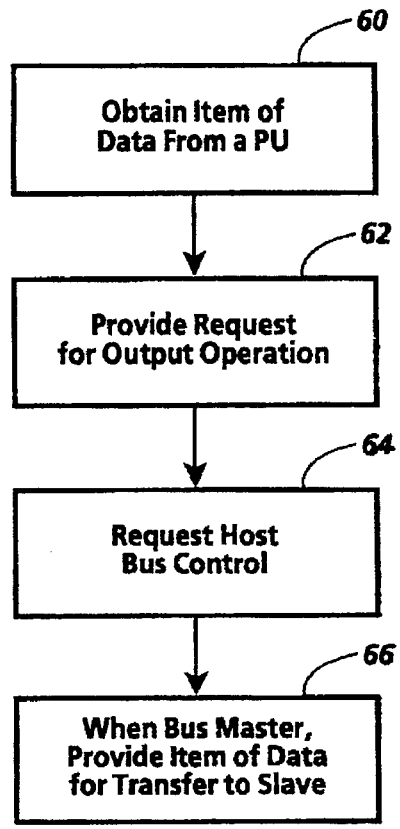
FIG. 2 is a flow chart showing general acts in a master operation that transfers data from a processing unit in the coprocessor of FIG. 1 to a slave on the host bus.
FIG. 2C is a flow chart showing general acts in a master operation that transfers data from a slave on the host bus to a set of processing units in the coprocessor of FIG. 1.
Figure 2C:
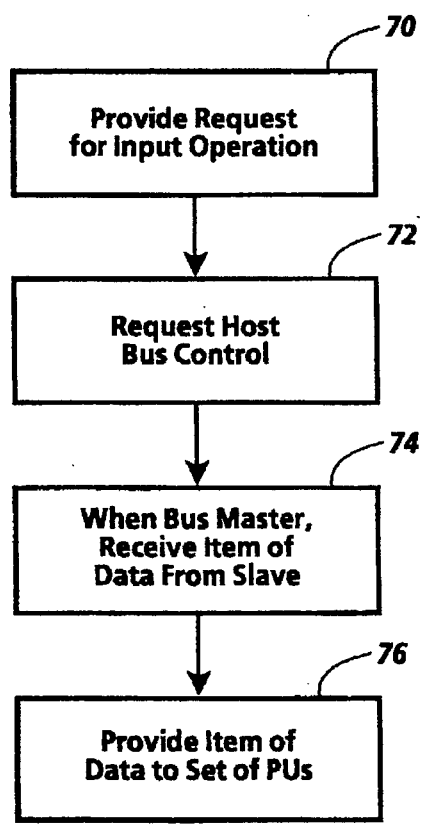

FIGS. 1–2C illustrate general features of the invention. FIG. 1 shows components of a parallel processor that can be connected as a coprocessor to a host processor's bus. FIG. 2A shows acts in a slave operation that provides data to control circuitry in the coprocessor. FIG. 2B shows acts in a master operation that transfers data from a processing unit to a slave on the host bus. FIG. 2C shows acts in a master operation that transfers data from a slave on the host bus to a set of processing units.

Host processor 10 in FIG. 1 includes host bus 12 to which can be connected a number of other components, such as host central processing unit (CPU) 14 and memory 16. Host bus 12 can be controlled by host bus control circuitry 18. Various other components could be connected to host bus 12, such as input/output devices and other coprocessors.

Coprocessor 20 in FIG. 1 is a parallel processor that includes processing units 22, coprocessor control circuitry 24 for controlling coprocessor 20, and host bus connecting circuitry 30 for connecting coprocessor 20 to host processor 10. Coprocessor control circuitry 24 provides control signals to processing units 22.

Host bus connecting circuitry 30 includes slave circuitry 32 and master circuitry 34.

Slave circuitry 32 is connected to host bus 12 so as to receive signals requesting coprocessor operations, which could be provided, for example, by host CPU 14. Slave circuitry 32 is also connected to respond by providing signals to coprocessor control circuitry 24 so that the requested coprocessor operation is performed.

Master circuitry 34 is connected to control circuitry 24 so as to receive signals requesting data transfer operations. In response, master circuitry 34 provides signals to host bus 12 requesting host bus operations. These signals could, for example, include a request for control of host bus 12, to which host bus control circuitry 18 could respond by granting bus control. Master circuitry 34 also transfers data from one of processing units 22 to host bus 12 or from host bus 12 to a set of at least one of processing units 22 so that the requested data transfer is performed.

In FIG. 2A, in the act in box 50, slave circuitry 32 receives signals indicating a request for a coprocessor operation from host bus 12. The signals can be provided by a master connected to host bus 12 according to the applicable bus protocol. In the act in box 52, slave circuitry 32 responds to the request by providing signals to coprocessor control circuitry 24. The signals could, for example, be control signals or could include an address or other item of data received from host bus 12 as part of the request.

In FIG. 2B, in the act in box 60, coprocessor control circuitry 24 provides signals to processing units 22 and to master circuitry 34 so that master circuitry 34 obtains an item of data from one of the processing units. In the act in box 62, coprocessor control circuitry 24 provides signals to master circuitry 34 requesting a data transfer operation. The requested operation includes an output operation in which the item of data from the processing unit is transferred to a slave connected to host bus 12. In the act in box 64, master circuitry 34 responds to the request by providing signals requesting control of host bus 12. When host bus control circuitry 18 grants control to master circuitry 34, in the act in box 66, master circuitry 34 provides the item of data to a slave through host bus 12.

In FIG. 2C, in the act in box 70, coprocessor control circuitry 24 provides signals to master circuitry 34 requesting a data transfer operation. The requested operation includes an input operation in which an item of data is received from a slave connected to host bus 12. In the act in box 72, master circuitry 34 responds to the request by providing signals requesting control of host bus 12. When host bus control circuitry 18 grants control to master circuitry 34, in the act in box 74, master circuitry 34 receives an item of data from the slave through host bus 12. In the act in box 76, coprocessor control circuitry 24 provides signals to master circuitry 34 and to processing units 22 so that master circuitry 34 provides the item to a set of at least one of processing units 22.

C. General Implementation Features

The general features described above in relation to FIGS. 1–2C could be implemented in many different ways with a wide variety of components and with various integrated circuit technologies. The following implementation employs commercially available byte-slice integrated circuits to perform coprocessing in a Sun SPARCStation workstation.

Figure 3:
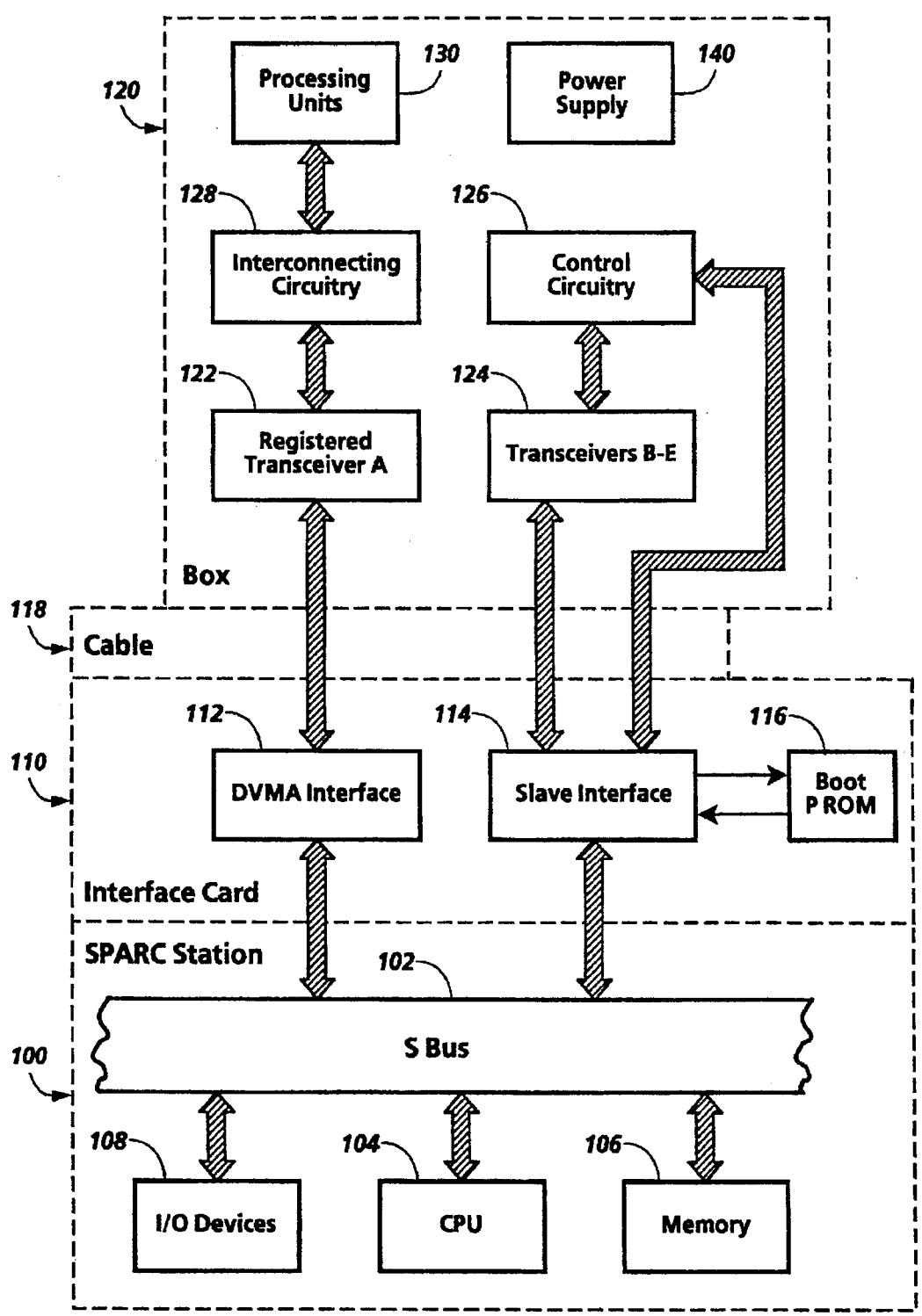
FIG. 3 is a schematic block diagram showing components in an implementation of a SIMD parallel processor connected to an SBus of a SPARCStation.
Figure 4:
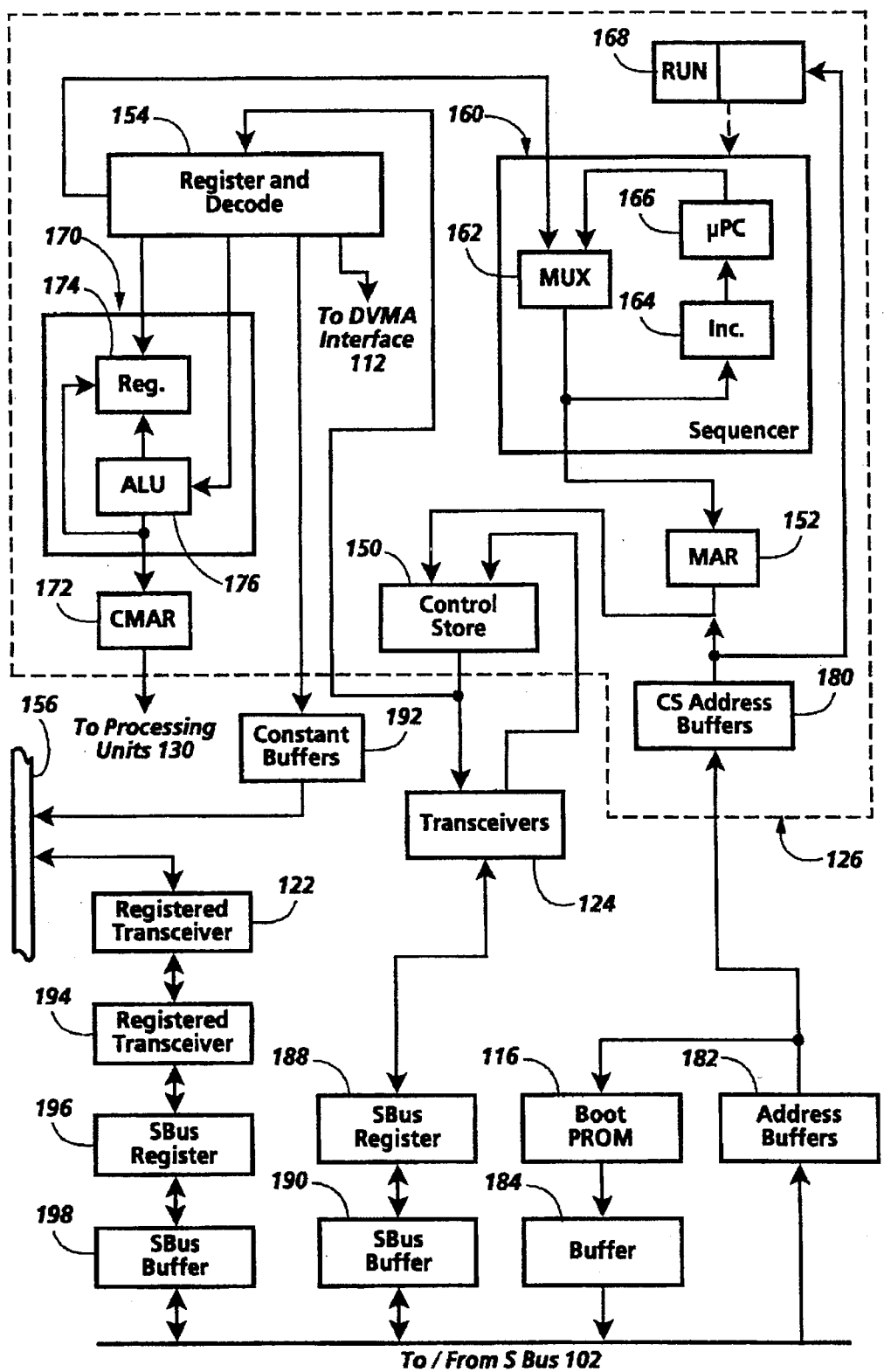
FIG. 4 is a schematic block diagram showing components of the control circuitry of FIG. 3.
Figure 5:
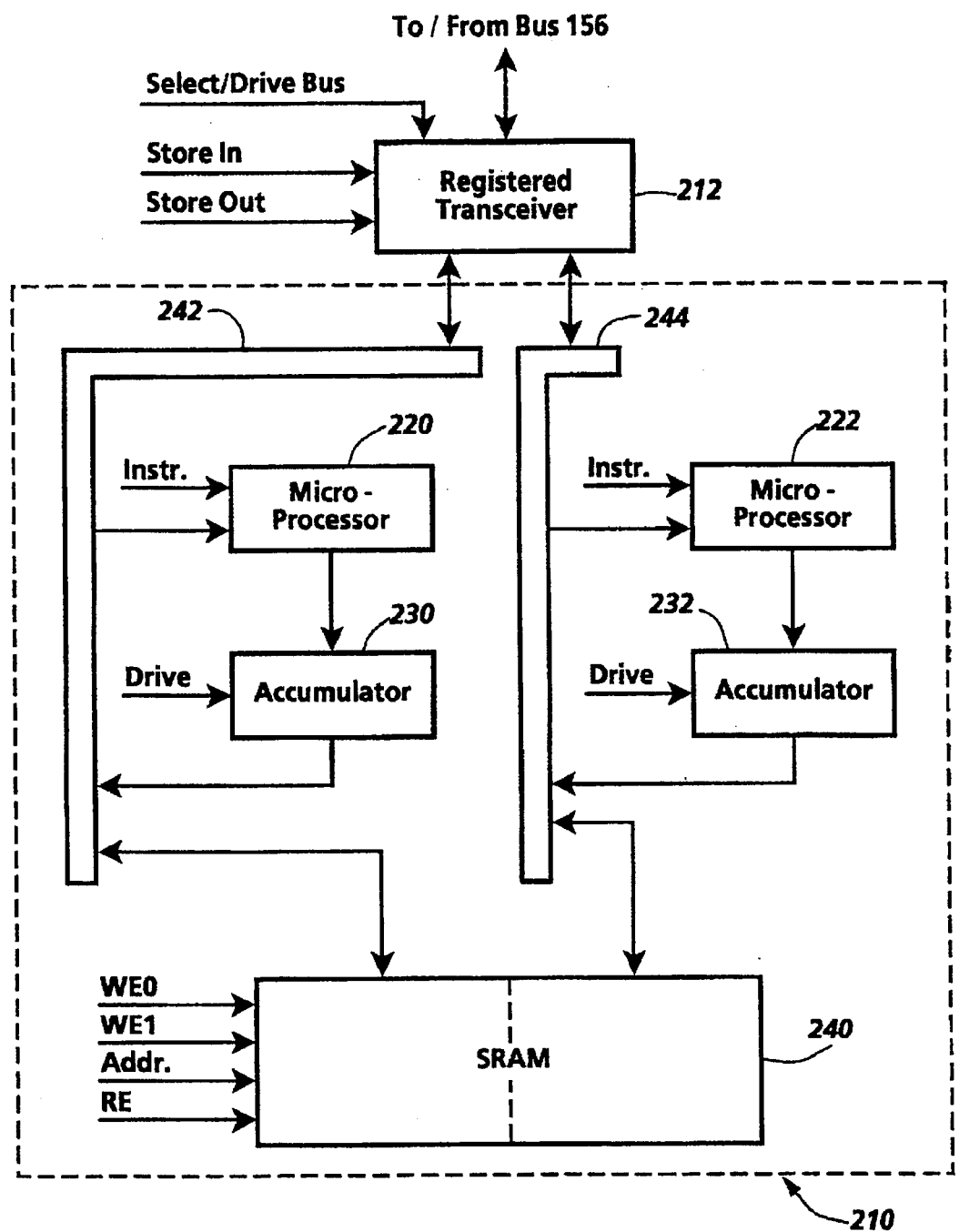
FIG. 5 is a schematic block diagram showing components of a processing unit in FIG. 3.
Figure 6:
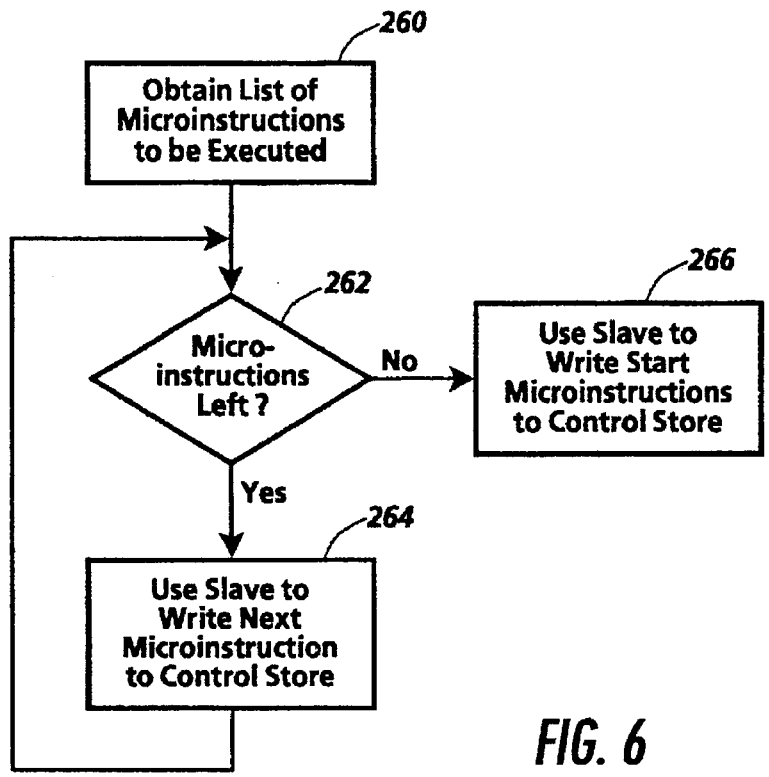
FIG. 6 is a flow chart showing general acts in loading microinstructions in a control store in FIG. 4.
Figure 7:
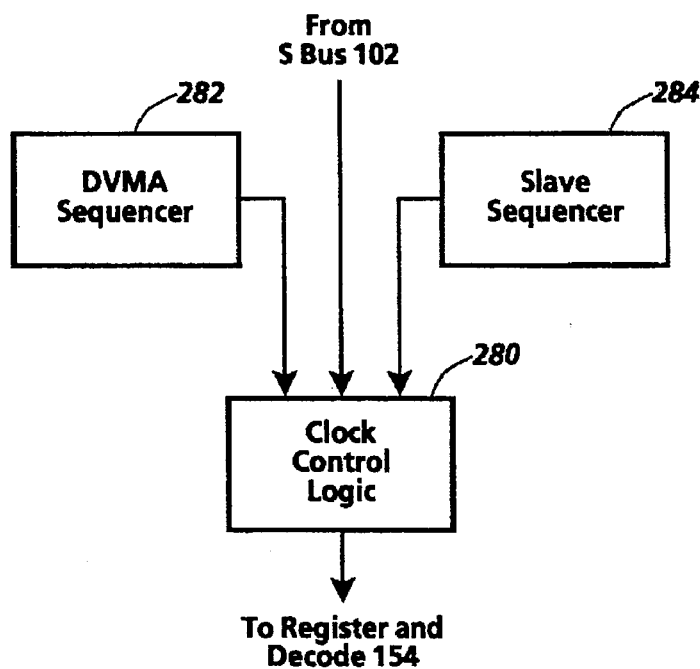
FIG. 7 is a schematic block diagram showing components that control clock signals to a box in FIG. 3.

FIG. 3 shows general components of the implementation and their connections to components in the host workstation. FIG. 4 shows components of the control circuitry in FIG. 3. FIG. 5 shows components of a processing unit in FIG. 3. FIG. 6 shows general acts in writing microinstructions to the control store in FIG. 4. FIG. 7 shows components that provide clock signals to components shown in FIGS. 4 and 5 for microinstruction execution.

FIG. 3 shows an implementation in which SPARCStation 100 serves as a host. SPARCStation 100 includes SBus 102, to which are connected central processing unit (CPU) 104, memory 106, and input/output (I/O) devices 108. Memory 106 has sufficient capacity to store image data defining several full size images, each requiring at least 1 megabyte of memory. Memory 106 can also store instruction data indicating conventional instructions CPU 104 can execute to perform operations on the image data, including compression, decompression, and other image manipulation operations. I/O devices 108 may include scanners, printers, modems, displays, disk drives, network connections, and other sources and destinations of data defining images.

Mounted in SPARCStation 100 is interface card 110, a printed circuit board on which are mounted components that form direct virtual memory access (DVMA) interface 112, slave interface 114, and boot PROM 116, a programmable read-only memory component. Interface card 110 also holds conventional connectors (not shown) for mounting card 110 into SPARCStation 100 and for providing an electrical connection to SBus 102. Interface board also holds conventional connectors (not shown) to which cable 118, which may be as short as 12 inches, can be mounted to provide an electrical connection to box 120. Circuitry (not shown) formed on a surface of interface card 110 provides electrical connections between the connectors and DVMA interface 112 and slave interface 114 and between slave interface 114 and boot programmable read only memory (PROM) 116.

DVMA interface 112, a master interface, and slave interface 114 can be implemented in accordance with SBus Specification B.0, Sun Microsystems, Inc. Part No. 800-5922-10, 1990, which describes signal protocols for SBus master and slave interfaces. Each interface can have a respective sequencer. In addition, as described below, card 110 includes a number of components that provide signals to components in box 120 or receive signals from components in box 120, thus performing functions of DVMA interface 112 or slave interface 114.

Boot PROM 116 can be an 8K×8 bit memory accessible by slave interface 114, which is only capable of byte reads from boot PROM 116 and of single word control store accesses.

Box 120 includes a printed circuit board with conventional connectors (not shown), to which cable 118 can be mounted to provide electrical connections to DVMA interface 112 and slave interface 114. Circuitry formed on the surface of the board (not shown) provides electrical connections from the connectors to components on the board, including registered transceiver 122, transceivers 124, and control circuitry 126. Registered transceiver 122, designated A, is further connected to interconnecting circuitry 128, which interconnects processing units 130. Transceivers 124, designated B–E, are connected through parallel lines to control circuitry 126. These transceivers can be implemented with conventional 32 bit bidirectional transceivers.

Box 120 also includes power supply 140, which can be a conventional power supply capable of providing approximately 40 amps at 5 volts, or 200 watts. Box 120 also contains a cooling fan (not shown).

The arrangement shown in FIG. 3 solves several problems in using a host workstation: For a SPARCStation, the card size and constraints on space, power consumption, signal loadings, and heat dissipation make it infeasible to include an entire SIMD parallel processor on a single card; therefore, box 120 includes the processing units, control circuitry, and most of the interconnecting circuitry, and card 110 includes only a small number of components that provide a connection between box 120 and SBus 102. In addition, dividing components into two modules in this way would allow card 110 to be replaced with an interface to another computer without significantly changing box 120. Finally, the extra space provided by box 120 facilitates debugging.

FIG. 4 shows components within control circuitry 126 and their connections to other components. In addition to the components shown, control circuitry 126 includes a conventional clock driver (not shown) for receiving and distributing the clock signal of SBus 102 at a frequency of 25 MHz, i.e. one cycle per 40 nsec, so that it can drive several components. The circuitry is designed so that control circuitry 126 can perform each possible instruction in one 40 nsec cycle. In other words, a new microinstruction and microinstruction address should be provided at each clock tick.

Control store 150 can be a 16K×128 bit static random access memory (SRAM) for storing microinstructions received from SBus 102. Upon receiving a microinstruction's address from memory address register (MAR) 152, a conventional register, control store 150 provides the microinstruction to microinstruction register and decode 154. Register and decode 154 provides various control signals, including instructions to the processing circuitry of each processing unit and buffer select signals to control transfer of data on common data bus 156.

Microcode sequencer 160 loads addresses into MAR 152. Multiplexer (MUX) 162 selects either a jump address from register and decode 154 or the address that immediately follows the previous address, generated by incrementer 164 and microprogram counter (µPC) 166. Sequencer 160 can be implemented with an IDT49C410 microprogram sequencer, described in 1990/1991 *Logic Databook*, Integrated Device Technology, Inc., Santa Clara, Calif., 1990, sections 5.4 and 7.4. Sequencer 160 can receive its opcodes directly from register and decode 154.

Control/status register 168 is a conventional register whose most significant bit, called the RUN bit, indicates whether sequencer 160 should perform normal addressing or should provide a special address that holds the coprocessor. The IDT49C410 sequencer has a JumpZero instruction to which it responds by providing the address of location 0 to MAR 152. Therefore, the special address can be location 0, and the microinstruction at location 0 in control store 150 can in general be a nonoperative (no-op) instruction that is repeatedly retrieved until the microprogram is ready to execute.

The RUN bit can be cleared by the SBus reset signal when SPARCStation 100 is reset. Slave interface 114 can also read or write control/status register 168, which could include only the RUN bit. The address space addressed by CS address buffers 180 can be divided so that only the first few bits of an address are used to decode whether the address is that of control/status register 168.

As suggested by the dashed line from control/status register 168 to sequencer 160, the RUN bit is not provided directly to sequencer 160, but is received by register and decode 154, which then responds appropriately. While the RUN bit is set, register and decode 154 receives in each cycle a microinstruction fetched from control store 150 and, in the next cycle, decodes the microinstruction and executes it by providing control signals to other components. Upon detecting that the RUN bit has been cleared, however, register and decode 154 provides a JumpZero instruction to sequencer 160 and ignores whatever microinstruction has been fetched in the previous cycle.

After a microprogram has been stored in control store 150, execution of the microprogram can be caused by writing a microinstruction to location 0 that, when executed, provides the starting address of the microprogram to sequencer 160 and again sets the RUN bit so that sequencer 160 can begin normal addressing. Since the microinstruction from location 0 is fetched from control store 150 twice before the first instruction of the microprogram is fetched, every microprogram should begin with a no-op instruction that provides a "Continue" opcode to sequencer 160. This causes incrementer 164 to increment the address in µPC 166, beginning normal address incrementing.

The final operation of each microprogram can write a completion code to a location in SPARCStation memory, and whenever the SPARCStation sees the completion code, it can clear the RUN bit. Until the RUN bit is cleared, the microprogram can perform a no-op loop or, alternatively, the microprogram itself could clear the RUN bit after writing the completion code.

Address processor 170 loads addresses into cache memory address register (CMAR) 172, connected to provide an address to each processing unit. The previous address provided to CMAR 172 can be stored in register 174.

Alternatively, an address from register and decode 154 can be loaded directly into register 174. ALU 176 can then operate on the value in register 174 to obtain the next address. Address processor 170 can be implemented with an IDT49C402B microprocessor, described in 1990/1991 *Logic Databook*, Integrated Device Technology, Inc., Santa Clara, Calif. 1990, sections 5.3 and 7.2. Register 174 can be the Q register or any of the other internal registers of address processor 170. Register and decode 154 can provide instructions, register specifiers, a carry signal, and addresses to address processor 170, and can also provide a write enable signal to the memory circuitry of one or more processing units.

Control store address buffers 180 are connected to receive addresses from address buffers 182 in slave interface 114 on interface card 110. This provides a path through which CPU 104 in SPARCStation 100 can provide an address to control store 150. Also, SBus 102 can provides two address bits through this path that are hardwired to logic that write enables 32 bits of SRAM or one 32 bit bank of SRAM at a time, since only one 32 bit word at a time can be received from SBus 102.

Each of transceivers 124 is connected to provide 32 bits to SBus register 188 on interface card 110, which in turn can provide data to SBus buffer 190, all of which can be implemented with conventional 32 bit components. This circuitry provides a path through which one 32 bit segment at a time of a 128 bit microinstruction in control store 150 can be read to SBus 102, one of the functions of slave interface 114.

Transceivers 124 are also connected to receive data from SBus register 188, which in turn receives data from SBus 102 through SBus buffer 190. Therefore, this circuitry also provides a path through which a microinstruction from SBus 102 can be loaded into control store 150, another function of slave interface 114.

In addition to providing addresses for control store 150 and for control/status register 168, address buffers 182 also provide addresses to boot PROM 116. Boot PROM 116 is read at boot time to identify card 110. Therefore, it begins at address 0 relative to its SBus slot. Boot PROM 116 stores data that indicates FCode instructions that can be executed by CPU 104 during boot to obtain data indicating an identifier of card 110, including what kind of card it is and which revision; indicating address space parameters; and indicating what driver should be loaded to communicate with card 110. These instructions can be written according to conventional techniques using the instructions set forth in *SBus Specification B.0*, Sun Microsystems, Inc. Part No. 800-5922-10, 1990, Appendix C, pp. 143–168, entitled "FCode Reference." Each instruction from boot PROM 116 is provided to SBus 102 through buffer 184.

Boot PROM 116 is read using byte accesses. If CPU 104 tries to read a 32 bit word during boot time, slave interface 112 responds by returning a byte response on Ack[2:0], causing CPU 104 to read one byte at a time. Boot PROM 116 drives only the most significant byte of the SBus data line.

FIG. 4 also shows constant buffers 192, a set of buffers through which register and decode 154 can provide data to common data bus 156. Common data bus 156 is also connected to processing units 130 and is therefore a part of interconnecting circuitry 128 in FIG. 3.

As shown, common data bus 156 is also connected to receive data from SBus 102 and provide data to SBus 102 through registered transceiver 122, designated A in FIG. 3. Transceiver 122 is connected to provide 32 bits to registered transceiver 194 on interface card 110, which in turn can provide data to SBus register 196 and SBus buffer 198, all of which can be implemented with conventional 32 bit components. This circuitry provides a path through which an item of data can be transferred from a processing unit to SBus 102, one of the functions of DVMA interface 112.

Transceiver 122 is also connected to receive data from registered transceiver 194, which in turn receives data from SBus 102 through SBus register 196 and SBus buffer 198. Therefore, this circuitry also provides a path through which an item of data can be transferred from SBus 102 to a set of processing units, another function of DVMA interface 112.

Register and decode 154 is also connected to provide some control signals directly to DVMA interface 112 on card 110. As a result, a microinstruction can provide signals to DVMA interface 112 so that it acts as a master on SBus 102.

FIG. 5 shows processing unit 210, the pth one of processing units 130, together with respective registered transceiver 212. Registered transceiver 212 provides a connection through which processing unit 210 receives data from common data bus 156 and provides data to common data bus 156. Therefore, registered transceiver 212 is a part of interconnecting circuitry 128 in FIG. 3. Registered transceiver 212 can be implemented with a 32 bit set of conventional registered transceivers, such as four 8 bit 74FCT651 transceivers from Integrated Device Technology, Inc., or any equivalent circuitry, such as two 16 bit transceivers. Registered transceiver 212 responds to signals from register and decode 154 by storing data from bus 156; by storing data from buses 242 and 244; by driving bus 156; or by driving buses 242 and 244.

Processing unit 210 includes microprocessors 220 and 222, each of which can be implemented with an IDT49C402B microprocessor, described in 1990/1991 *Logic Databook*, Integrated Device Technology, Inc., Santa Clara, Calif., 1990, sections 5.3 and 7.2. In this implementation, each microprocessor includes an arithmetic logic unit (ALU), a Q register, a 64-register bank, and internal shift logic so that registers can be cascaded to form very long shift registers. An array of P processing units, each with two 16 bit microprocessors, can thus load, store, or operate on 32*P bits per clock cycle. All the microprocessors can receive signals indicating instructions in parallel from register and decode 154.

Accumulators (ACC) 230 and 232 are connected to receive data output by microprocessors 220 and 222, respectively. Accumulators 230 and 232 are necessary because microprocessors 220 and 222 do not produce cache write data quickly enough. In addition, accumulators 230 and 232 make it possible to perform an operation while shifting a microprocessor's Q register, because the output from each microprocessor's ALU can be stored in its accumulator and then fed back to the microprocessor's data input during the next cycle. Each accumulator can be implemented with a conventional 16 bit register with tri-state outputs. The accumulators are controlled in parallel by signals from register and decode 154 indicating whether to provide output.

Processing unit 210 also includes static RAM (SRAM) 240, a 64K×32 bit memory, connected through internal buses 242 and 244 so that 16 bits of each data unit are accessible by microprocessor 220 and the other 16 bits are accessible by microprocessor 222. SRAM 240 can be implemented with a Motorola MCM3264 module. An array of P processing units, each with one such memory module, can thus store a total of P*2M bits of data. SRAM 240 and each of the other memory modules receives addresses in parallel from CMAR 172, and each memory module also receives write enable signals and read enable signals from register and decode 154. Signals from register and decode 154 can write enable or read enable both halves of a data unit, and separate signals can also indicate write enables to each half of each data unit. SRAM 240 can be managed as a cache memory.

As shown, internal buses 242 and 244 are each connected to registered transceiver 212 and to SRAM 240. In addition, bus 242 is connected to receive data from accumulator 230 and to provide data to processor 220, while bus 244 is connected to received from accumulator 232 and to provide to processor 222. Data transfer on internal buses 242 and 244 is controlled by signals from register and decode 154 to registered transceiver 212, to accumulators 230 and 232, and to SRAM 240 indicating which source should drive the buses. The signal to SRAM 240 is a read enable signal as mentioned above.

Data can be transferred from SBus 102 to either of microprocessors 220 and 222 by first writing the data into SRAM 240 through the respective internal bus 242 or 244. Then the data is read onto the respective internal bus 242 or 244 and the microprocessor executes an instruction causing it to read data from the internal bus. Rather than following this path, data could be provided more directly to each microprocessor. For example, register and decode 154 could be connected to a separate transfer enable line for each microprocessor, so that data from bus 102 could be written directly to each microprocessor.

If SRAM 240 is implemented with a dual port memory component, rather than a single port component as shown, microprocessors 220 and 222 can be connected to one memory port and registered transceiver 212 can be connected to the other. Write accesses from the microprocessors and from registered transceiver 212 can be synchronized to prevent collisions.

Register and decode 154 includes logic that produces control signals in response to microinstructions from control store 150 according to conventional techniques. The microinstructions could be encoded in a wide variety of ways. For example, each microinstruction could include a three bit field indicating a source to drive bus 156; a two bit field indicating a source to drive buses 242 and 244; a six bit field indicating which SRAMs are write enabled; a ten bit field indicating an instruction for the microprocessors; two six bit fields indicating microprocessor A register and B register, respectively; a two bit field to set microprocessor carry inputs; a ten bit field indicating an instruction for address processor 170; two six bit fields indicating A register and B register, respectively, in address processor 170; a four bit field indicating an instruction for sequencer 160; a two bit field that selects a source for a single bit that controls whether a branch is taken; a single bit field indicating loading of μPC 166 in sequencer 160; a single bit field indicating the carry in of sequencer 160; a single bit field indicating the carry in of address processor 170; and a sixteen bit field indicating a constant for sequencer 160, address processor 170, or the microprocessors.

In FIG. 6, the act in box 260 obtains a list of microinstructions to be executed. Host CPU 104 can, for example, obtain a list by retrieving a list from memory 106 or by executing instructions that produce a list.

The act in box 262 begins an iterative operation that loads each microinstruction into control store 150. During the act in box 264 for each iteration, slave interface 114 writes a microinstruction into control store 150. Host CPU 104 can, for example, provide an address to address buffers 182 and a series of four 32 bit microinstruction segments to SBus buffer 190, together with signals to a sequencer in slave interface 114 requesting each 32 bit microinstruction segment be loaded at the address.

In response to the request, slave interface 114 can provide control signals to transfer each microinstruction segment in the series to SBus register 188 and to a respective one of transceivers 124. Each microinstruction is received in four 32 bit segments, and each 32 bit segment is written to control store 150 as it is received. Slave interface 114 can also provide control signals to transfer the address to CS address buffers 180 and to control the output from MAR 152 so that the address in CS address buffers 180 is presented at the address port of control store 150. Slave interface 114 can also provide signals to write enable 32 bits of SRAM in control store 150. Then, slave interface 114 can provide a write signal to control store 150 so that a 32 bit segment of the microinstruction is written into the write enabled 32 bits at the address in CS address buffers 180.

A special start sequence of microinstructions can be written into an appropriate location in control store to start execution of a list of microinstructions. Therefore, when the list is completely written into the control store, the act in box 266 is performed, during which slave interface 114 writes the star sequence.

When the RUN bit is clear, as described above, sequencer 160 can repeatedly receive a JumpZero instruction, so that it repeatedly fetches a no-op microinstruction at location 0. The start sequence can therefore be written by writing a JUMP-to-location-n microinstruction to location 0, where n is the starting location of the microinstructions to be executed next. Subsequently, the RUN bit can be set by slave interface 114 in response to the current SBus master.

Due to pipelining, each JUMP microinstruction affects two cycles, the first to obtain and latch the address of the next microinstruction into MAR 152 and the second to fetch the microinstruction at the address in MAR 152. Therefore, the address in MAR 152 is that of location 0 until the JUMP-to-location-n microinstruction is executed, and as a result of the preceding JUMP-to-location-0 microinstruction, the JUMP-to-location-n microinstruction is again fetched from location 0.

Because the JUMP-to-location-n microinstruction is fetched twice, it is executed twice. Each time it is executed, the microinstruction at location n is fetched. Therefore, the microinstruction at location n is also executed twice, and it can be a processor no-op that provides a "Continue" opcode to sequencer 160, causing sequencer 160 to start incrementing the address so that the microinstruction at location n+1 is fetched, and so forth.

Before the act in box 260 and after the act in box 266, host CPU 104 can perform any of a wide variety of activities. For example, if host CPU 104 is managing a queue of lists of microinstructions, each to be loaded to control store 150 in the manner shown in FIG. 6, CPU 104 can maintain the queue and perform any operations necessary to obtain subsequent lists on the queue. CPU 104 can also perform operations to determine whether the next list on the queue is already loaded into control store 150, in which case it need not be loaded again, but can be called by loading a JUMP-to-location-n microinstruction as in the act in box 266. Host CPU 104 can perform multitasking, in which case it can perform other tasks after loading a list of microinstructions. Or it could wait for execution of the list to be completed or for an interrupt from the coprocessor.

FIG. 7 illustrates components that control clock signals so that a microinstruction can be loaded into control store 150 without interfering with execution of a previous microinstruction. Clock control logic 280 on card 110 receives clock signals from SBus 102, as do other components on card 110 including DVMA sequencer 282, slave sequencer 284, and SBus register 188. Clock control logic 180 always provides a clock signal to components in box 120, unless it receives a signal from DVMA sequencer 282 or from slave sequencer 284 indicating clock signals should not be provided to box 120. For example, whenever slave sequencer 284 is providing control signals to load a microinstruction into control store 150, it provides a signal to clock control logic 180 to prevent clock signals. In general, DVMA sequencer 282 stops clock signals when DVMA sequencer 282 either is attempting to gain control of SBus 102 as indicated by a Bus Grant signal from an SBus arbiter or is awaiting a signal from slave sequencer 284 on the SBus Ack[2:0] lines.

Each clock signal from clock control logic 280 goes to register and decode 154 and can also go directly or via register and decode 154 to any other component in box 120 that requires a clock signal. Register and decode 154 responds to a clock signal by decoding a microinstruction read from control store 150. Other components that include registers must also receive clock signals. For example, in the implementation of FIGS. 4 and 5, sequencer 160, address decoder 170 and microprocessors 220 and 222 must receive clock signals because of their internal registers. Similarly, registered transceivers 122, 194, and 212; MAR 152; CMAR 172; SBus registers 188 and 196; and accumulators 230 and 232 must receive clock signals although, as noted above, SBus register 188 can receive clock signals directly from SBus 102. Some other components may be implemented to require clock signals, such as control store 150 and SRAM 240; these components may also be implemented so that no clock signal is required, but with register and decode 154 providing read enable and write enable signals. A sequence of several clock signals may all involve a single microinstruction, from obtaining its address to storing data in SRAM 240 in response to its execution.

In addition to the general implementation features above, a number of features specific to this invention are set forth below.

D. General Application Features

The general implementation features described above could be used in a wide variety of data processing applications. They are expected to be particularly useful, however, in performing some types of image processing more rapidly than they could be performed on a serial processor. In particular, the features described above could be used to implement techniques similar to those described in Serra, J., *Image Analysis and Mathematical Morphology*, Academic Press, 1982 and Serra, J., *Image Analysis and Mathematical Morphology, Volume 2: Theoretical Advances*, Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to implement basic image processing operations, such as reduction, enlargement, rotation, tiling, and arithmetic operations on pixel values such as bit counting.

An implementation of reduction and enlargement using the features described above is described in U.S. patent application Ser. No. 07/993,939, now issued as U.S. Pat. No. 5,437,045, entitled "Subsampling and Spreading Circuitry for SIMD Architecture" ("the Subsampling/Spreading application"), incorporated herein by reference.

Implementations of rotation using the features described above are described in U.S. patent applications Ser. No. 07/993,169, now abandoned, entitled "One Dimensional SIMD System for Performing Orthogonal Rotations," and Ser. No. 07/994,490, now issued as U.S. Pat. No. 5,450,604, entitled "One Dimensional SIMD System with Buffers for Performing Orthogonal Rotations," ("the Rotation applications") both incorporated herein by reference.

An implementation of tiling using the features described above is described in U.S. patent application Ser. No. 07/993,286, now issued as U.S. Pat. No. 5,428,804, entitled "Edge Crossing Circuitry for SIMD Architecture" ("the Tiling application"), incorporated herein by reference.

Implementations of operations on operands with plural pixel values that can use the features described above are described in U.S. patent application Ser. Nos. 07/993,925, now issued as U.S. Pat. No. 5,408,670, entitled "Performing Arithmetic in Parallel on Composite Operands with Packed Multi-bit Components"; 07/993,213, now issued as U.S. Pat. No. 5,375,080, entitled "Performing Arithmetic on Composite Operands to Obtain a Binary Outcome for Each Multi-bit Component"; and in copending coassigned U.S. patent application Ser. No. 07/993,938, entitled "Masks for Selecting Multi-bit Components in a Composite Operand," ("the Packed Component applications") all incorporated herein by reference.

As shown in this application and other applications incorporated herein by reference, the implementation described above provides a one-dimensional SIMD array of processing units. Each processing unit can perform operations for one or more full height columns of pixels from an image. If the value of each pixel is indicated by more than one bit, the pixel values are stored horizontally rather than vertically, eliminating the need for corner turning operations between the host and the parallel processor.

The general implementation features described above may also be useful in various other applications, such as searching an image database for images containing a particular set of features; scanning envelopes for addresses; interpreting forms from a high-speed scanner; machine vision; and process-specific print image correction and verification.

E. Specific Implementation Features

Figure 8:
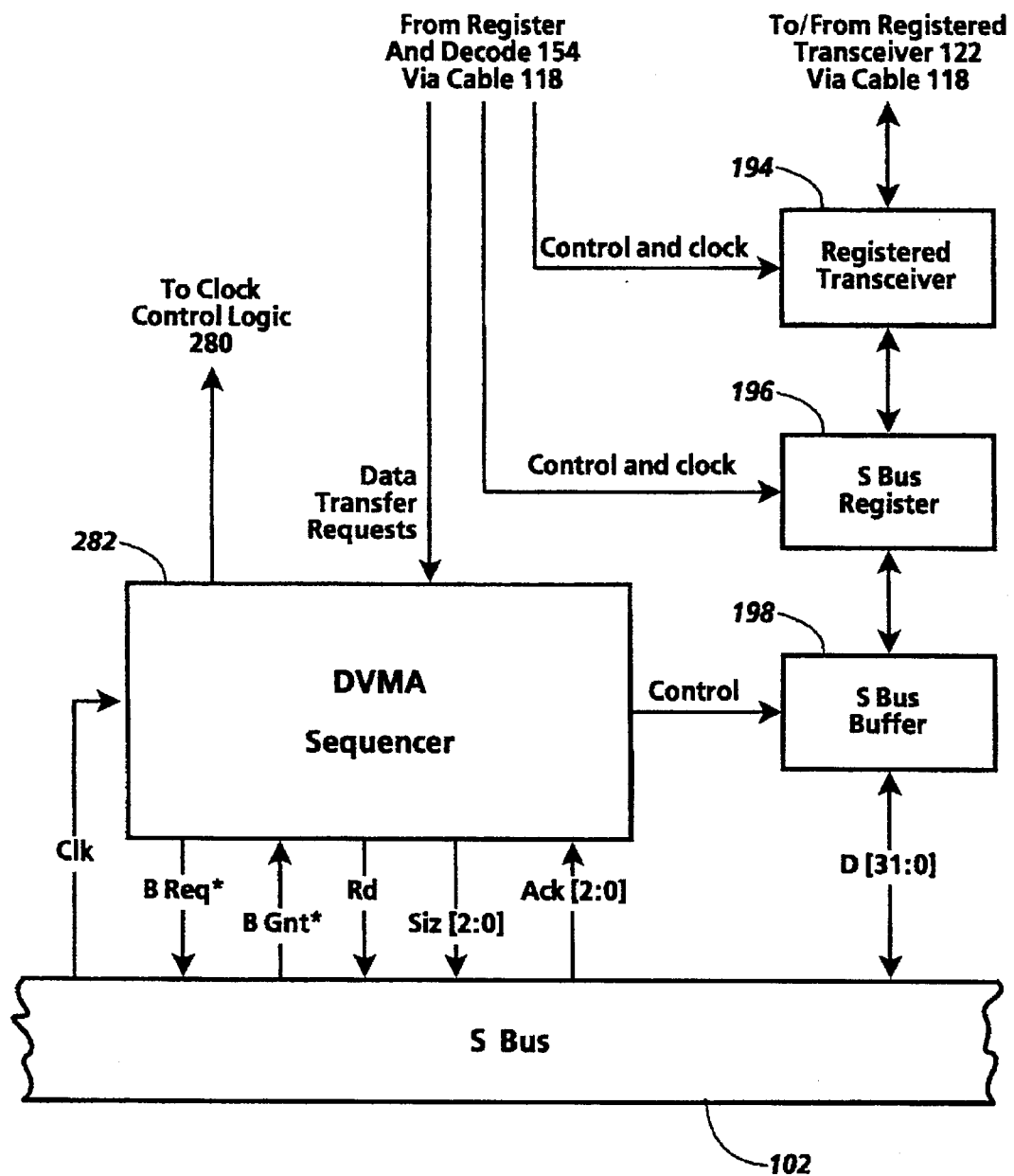
FIG. 8 is a schematic block diagram showing lines connected the DVMA sequencer in FIG. 7 to an SBus and to other components of the master circuitry.
Figure 9:
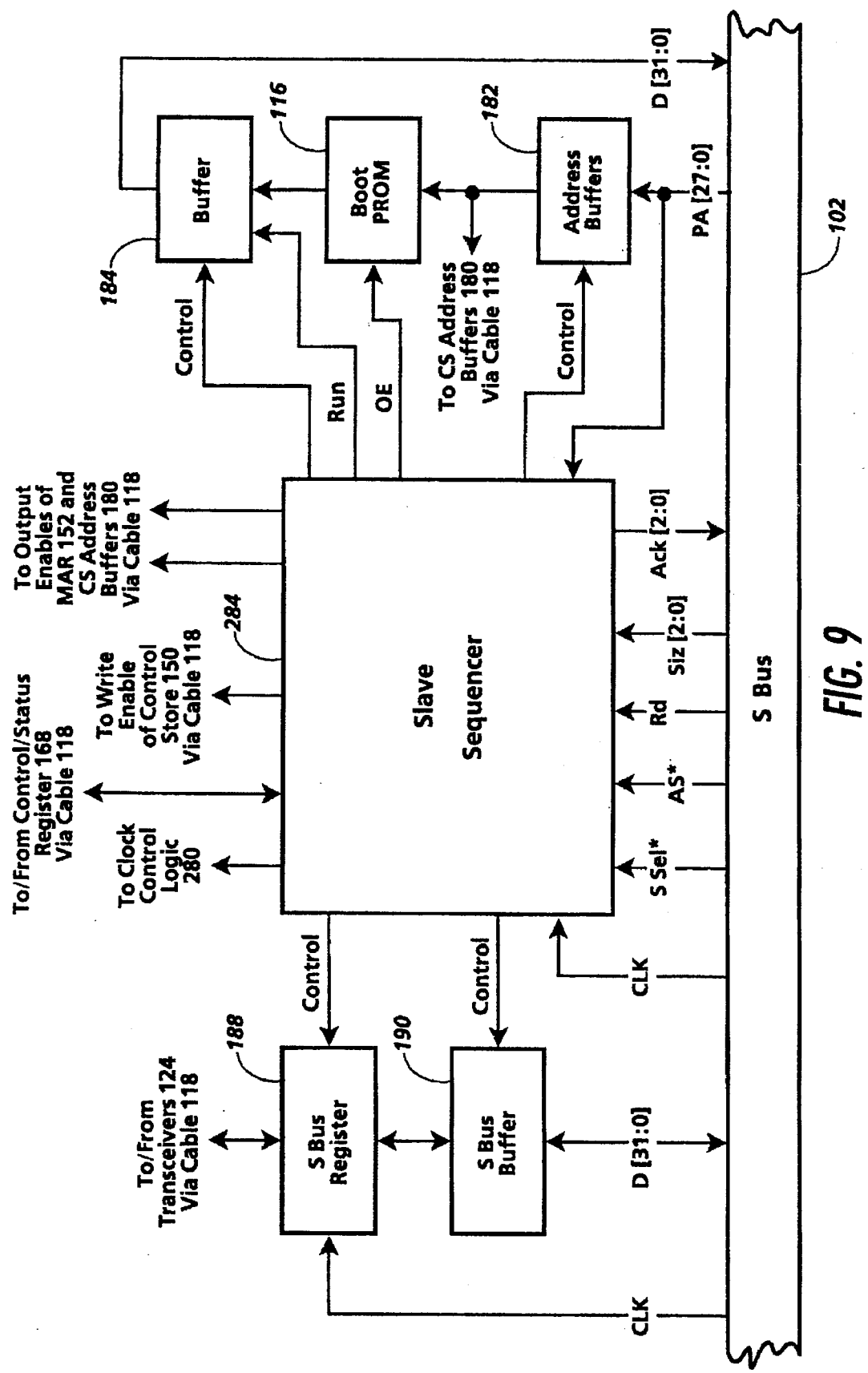
FIG. 9 is a schematic block diagram showing lines connecting the slave sequencer in FIG. 7 to an SBus and to other components of the slave circuitry.

FIGS. 8–25 show how the general implementation features described above could be used to implement the invention. FIGS. 8 and 9 show how DVMA sequencer 282 and slave sequencer 284 are connected to other components. FIGS. 10–15 show how slave sequencer 284 responds to requests for operations. FIGS. 16–19 show how master sequencer 282 responds to request for single word read and write operations. FIGS. 20–25 show how master sequencer 282 responds to requests for burst transfer operations, in which multiple words are read or written.

1. Sequencer Connections

As described above, DVMA interface 112 and slave interface 114 can each be implemented with a respective sequencer, DVMA sequencer 282 and slave sequencer 284. FIG. 8 shows how DVMA sequencer 282 is connected to SBus 102 and other components. FIG. 9 shows how slave sequencer 284 is connected to SBus 102 and other components.

DVMA sequencer 282 and slave sequencer 284 are each implemented in accordance with the requirements set forth in *SBus Specification B.0*, Sun Microsystems, Inc. Part No. 800-5922-10, 1990, from which one can determine signals that must be provided to SBus 102, cycles available to respond to signals from SBus 102, timing of signals on SBus 102, protocols for signals on SBus 102, and necessary contents of boot PROM 116. The lines labeled Clk, D[31:0], BReq*, Bgnt*, Rd, Siz[2:0], Ack[2:0], As*, PA[27:0], and SSel* in FIGS. 8 and 9 can be understood from *SBus Specification B.0*. DVMA sequencer 282 and slave sequencer 284 can each be implemented, for example, with transistors or with one or more programmable logic arrays (PLAs) that provides signals as described in greater detail in relation to FIGS. 10–25. In the implementation described, signals generally advance within the coprocessor on rising edges of procClk, except that data advances through registered transceiver 188 and certain signals advance within DVMA sequencer 282 and slave sequencer 284 on rising edges of Clk.

In FIG. 8, DVMA sequencer 282 receives signals from register and decode 154 that control the manner in which it provides signals to other components, including SBus 102 and SBus buffer 198. As shown, SBus Buffer 198 is connected to the D[31:0] lines of SBus 102, and SBus buffer 198 operates under control of DVMA sequencer 282 to satisfy timing constraints of SBus 102. Registered transceiver 194 and SBus register 196, on the other hand, provide pipeline stages. Registered transceiver 194, together with registered transceiver 122, ensures reliable clocking of signals across cable 118.

In addition to the fields mentioned above, each microinstruction can include fields relating to operations of DVMA sequencer 282. A single bit can indicate whether the current cycle is an SBus DMA read. A three-bit field can indicate the burst transfer size using the standard SBus encodings to indicate sizes. A two-bit field can indicate the state of an SBus DMA master cycle, including a state that does not wait, a state that waits for Bus Grant, and a state that waits for a word signal on lines Ack[2:0] from an SBus slave. Another two-bit field can provide information relating to branching, with values to indicate the previous operation provided a carry or borrow signal, the previous operation's result was zero, the previous operation's result was negative, or RerunAck, a condition in which the SBus controller drops Bus Grant, turning off all drivers, so that the sequencer must restart DVMA sequencer 282 to perform a transfer.

Each data transfer operation controlled by DVMA sequencer 282 can begin in response to a bus request signal from register and decode 154 indicating that a request for control of SBus 102 should be made. The bus request signal can be a single bit which DVMA sequencer 282 provides to pull down its BReq* line on SBus 102. At the same time, DVMA sequencer 282 can provide a signal to clock control logic 280 to stop providing clock signals to register and decode 154.

Before providing the bus request signal, register and decode 154 can perform any other operations necessary to prepare for the requested data transfer operation. For example, an item of data indicating an address can be stored in registered transceiver 194 and, for a write operation, an item of data to be written can be stored in registered transceiver 122. In either case, the item of data can be obtained from processing units 130, one of which could obtain the item of data through appropriate operations of microprocessors 220 and 222 or by retrieving the item of data from SRAM 240; or the item of data can be obtained from constant buffers 192.

When it provides the bus request signal, register and decode 154 can also provide a read/write signal and a block size signal. The read/write signal indicates whether the requested operation is a read operation or a write operation, and the block size signal indicates the size of a block of data to be transferred. After it pulls down its BReq* line and receives a signal on its BGnt* line indicating it has control of SBus 102, DVMA sequencer 282 can also provide the read/write signal to the Rd line of SBus 102 and the block size signal to the Siz[2:0] lines of SBus 102.

In response to the BReq* line, SBus control circuitry in SPARCStation 100 pulls down the BGnt* line of DVMA sequencer 282, giving it control of SBus 102. In response to BGnt*, DVMA sequencer 282 provides signals as discussed in greater detail below to perform the requested data transfer operation, reading or writing data from or to a slave connected to SBus 102. During a read operation, whenever the slave provides a signal on Ack[2:0] lines followed by data on lines D[31:0], DVMA sequencer 282 must be prepared to provide control signals to SBus buffer 198 to receive the data. DVMA sequencer 282 must also be prepared to signal clock control logic 280 so that register and decode 154 receives a clock pulse and can control SBus register 196 to store the data received. During a write operation, DVMA sequencer 282 similarly provides signals so that data from SBus register 196 is provided to SBus lines D[31:0] through SBus buffer 198.

In addition to the circuitry shown in FIG. 8, various additional circuitry can be provided to perform functions of master circuitry 34 in FIG. 1. For example, as described in more detail in U.S. patent application Ser. No. 07/993,218, now issued as U.S. Pat. No. 5,450,603, entitled "SIMD Architecture with Bus for Transferring Data to and from Processing Units" ("the Common Bus application"), incorporated herein by reference, master circuitry 34 can include common data bus 156 connected to all of the processing units. As described above in relation to FIG. 5, master circuitry 34 can also include, for each processing unit, registered transceiver 212, to which control circuitry 126 provides signals to indicate a processing unit as a source of data or to indicate a processing unit is in a set of processing units that are destinations for data.

Common data bus 156 and registered transceiver 212 provide a path for transfer of data back and forth to SBus 102 that may be more efficient than other arrangements, such as separate lines to each processing unit. Through this path, data can be transferred directly from a processing unit to registered transceiver 122, and then through registered transceiver 194, SBus register 196, and SBus buffer 198 to SBus 102. Similarly, data from SBus 102 can be transferred through SBus buffer 198, SBus register 196, and registered transceiver 194 to registered transceiver 122, and then directly to a set of processing units. Registered transceiver 122, registered transceiver 194, and SBus register 196 therefore serve as a pipeline for storing items of data being transferred between common data bus 156 and SBus 102. As described above in relation to FIG. 5, register and decode 154 can provide write enable signals to store data from registered transceiver 212 of each processing unit in the set in the processing unit's SRAM 240.

The path provided by the circuitry described above does not include corner turning circuitry. This is feasible if each processing unit is structured to handle data in horizontal format, as discussed in greater detail in the Packed Component applications.

The circuitry in FIG. 8 can perform direct memory access ("DMA") reads and writes to a memory such as memory 16 in FIG. 1 without involvement of host CPU 14. For example, in performing image processing, master circuitry 14 can, independent of a host CPU, read or write data defining a segment of an image in accordance with the requirements of microprocessors 220 and 222 and the capacity of SRAM 240. This capability can be used to handle each of a number of tiles in an image in sequence. Because SRAM 240 can store more items of data than the internal registers of microprocessors 220 and 222, SRAM 240 can be used to cache data for microprocessors 220 and 222.

In FIG. 9, slave sequencer 284 receives signals on the SSel*, AS*, Rd, Siz[2:0], and PA[27:0] lines of SBus 102 indicating a requested operation.

SBus 102 includes an SSel* line for each slave to which it is connected. When the bus control circuitry receives a virtual address on the D[31:0] lines indicating a location within a slave's address space, the bus control circuitry pulls the slave's SSel* line low to indicate a request for an operation by the slave. The bus control circuitry also translates the virtual address to an appropriate physical address and provides the physical address on the PA[27:0] lines, at which time the bus control circuitry can use the AS* line to indicate that the SSel*, Rd, and Siz[2:0] lines are valid, that an address is on PA[27:0], and that the master can stop providing the virtual address on the D[31:0] lines.

The signals on the SSel*, AS*, Rd, Siz[2:0], and PA[27:0] lines control the manner in which slave sequencer 284 provides signals to other components, including SBus 102, SBus register 188, and SBus buffer 190. In response to a falling edge on its SSel* line and the AS* line, for example, slave sequencer 284 provides a signal on the Ack[2:0] lines of SBus 102, indicating whether the request on the Rd, Siz[2:0], and PA[27:0] lines is an error or indicating a size of data units that can be read or written on lines D[31:0] in performing a requested operation. Although SBus slaves are permitted, in general, to handle transfers of several different sizes from byte size up to 16 word blocks, slave sequencer 284 need only be implemented with limited capabilities. For example, slave sequencer 284 could only handle word and byte transfers, and could indicate a word or a byte on lines Ack[2:0].

As shown, SBus buffer 190 is connected to the D[31:0] lines of SBus 102, and SBus buffer 190 operates under control of slave sequencer 284 to satisfy timing constraints of SBus 102. SBus register 188 is clocked from SBus 102, but is controlled by slave sequencer 284 to provide a pipeline stage that ensures reliable clocking of signals across cable 118 to and from transceivers 124 and control store 150. Slave sequencer 284 could, for example, determine the direction from which SBus register 188 receives data and could enable or disable it during a given cycle.

Similarly, address buffers 182 are connected to the PA[27:0] lines of SBus 102, and, under control of slave sequencer 284, provide addresses to CS address buffers 180 via cable 118 and to boot PROM 116. Boot PROM 116 provides its output to the D[31:0] lines of SBus 102 through buffer 184 under control of slave sequencer 284. Slave sequencer 284 also has a connection through which it can drive one bit of buffer 184 directly to indicate the value of the RUN bit in control/status register 168.

Slave sequencer 284 also provides signals to clock control logic 280, to write enable lines of control store 150 via cable 118, and to output enable lines of MAR 152 and CS address buffers 180 via cable 118. The output enable signals can be provided to conventional circuitry that gates the outputs from MAR 152 and CS address buffers 180 to select an address for accessing control store 150. In addition to the lines shown, slave sequencer 284 is also connected to provide control signals to transceivers 124.

The operations controlled by slave sequencer 284 include operations that read data from or write data to control store 150, operations that read data from or write data to control/status register 168, and operations that read data from boot PROM 116 to SBus 102. If necessary, slave sequencer 284 can provide a control signal so that address buffers 182 are enabled to provide data indicating an address from lines PA[27:0] to boot PROM 116 and to CS address buffers 180. From the high order bits of the address, slave sequencer 284 can determine whether the address is for boot PROM 116, control store 150, or control/status register 168. For example, addresses 0 through (256K–1) can be for boot PROM 116, addresses 256K through (512K–1) for control store 150, and addresses 512K through (768K–1) for control/status register 168.

Slave sequencer 284 can provide an output enable signal to boot PROM 116 to read data at the address indicated by data in address buffers 182. Then, slave sequencer 284 can provide a control signal to buffer 184 to enable it to provide data from boot PROM 116 on lines D[31:0] of SBus 102. Since boot PROM 116 provides one byte at a time, slave sequencer 284 provides a byte signal on Ack[2:0] when it receives an address for boot PROM 116 and a word signal on Siz[2:0].

Slave sequencer 284 can provide signals to the output enables of MAR 152 and CS address buffers 180 so that the address from CS address buffers 180 is provided to control store 150. Based on the Rd line, slave sequencer 284 can provide a signal to the write enable lead of control store 150 indicating whether the operation is a read or a write operation. Slave sequencer 284 can provide additional signals to transfer a word to or from control store 150.

If an operation reads a word from control store 150, slave sequencer 284 can provide select signals to transceivers 124 and control signals to SBus register 188 and SBus buffer 190 to transfer the word to lines D[31:0] of SBus 102. Slave sequencer 284 can transfer data from control store 150 to SBus 102 when control store 150 is being used as a mailbox between the coprocessor and the host CPU, and also during diagnostic operations.

If an operation writes control store 150, slave sequencer 284 can transfer a word to be written from lines D[31:0] to the appropriate one of transceivers 124 by providing control signals to SBus buffer 190 and SBus register 188 and select signals to transceivers 124. One of the main functions of slave sequencer 284 is to transfer microinstructions from SBus 102 to control store 150 in this manner. Slave sequencer 284 can also transfer data from SBus 102 to control store 150 when control store 150 is being used as a mailbox between the coprocessor and the host CPU.

If an operation reads or writes control/status register 168 in the current implementation, only the RUN bit is read or written. Slave sequencer 284 is connected to provide data to be written directly to control/status register 168 and is also connected to receive data being read directly from control/status register 168. If a read operation, slave sequencer 284 can provide the value of the RUN bit to one or more of lines D[31:0] through buffer 184. If a write operation, the address on lines PA[27:0] can indicate whether the RUN bit should be set or cleared, and slave sequencer 284 can provide a set or clear signal directly to control/status register 168.

2. Sequencer Operations

FIGS. 10–15 illustrate in greater detail how signals are provided during operations controlled by slave sequencer 284. FIGS. 16–25 illustrate in greater detail how signals are provided during operations controlled by DVMA sequencer 282. In each case, logic in the sequencer controlling the operation provides signals to other components based on signals that it receives. The logic can be designed according to conventional digital logic design principles.

Most of the signals shown in FIGS. 10–25 are described above in relation to FIGS. 8 and 9. In addition, each timing diagram includes the signals Clk and procClk. SBus 102 has a Clk line that is received by clock control logic 280 as described above in relation to FIG. 7. Clock control logic 280 in turn provides procClk to register and decode 154.

Clock control logic 280 can operate as if it were a single AND gate with three inputs. One input is Clk from SBus 102. Another is a line that slave sequencer 284 pulls low to stop procClk and the last is a line that DVMA sequencer 282 pulls low to stop procClk. Therefore, procClk can be stopped by either slave sequencer 284 or DVMA sequencer 282, but it can only be restarted if both sequencers permit it to restart. To prevent inadvertent spikes on the procClk signal, slave sequencer 284 and DVMA sequencer 282 may only change the state of a clock control signal while the SBus Clk signal is low.

a. Slave Operations

Figure 10:
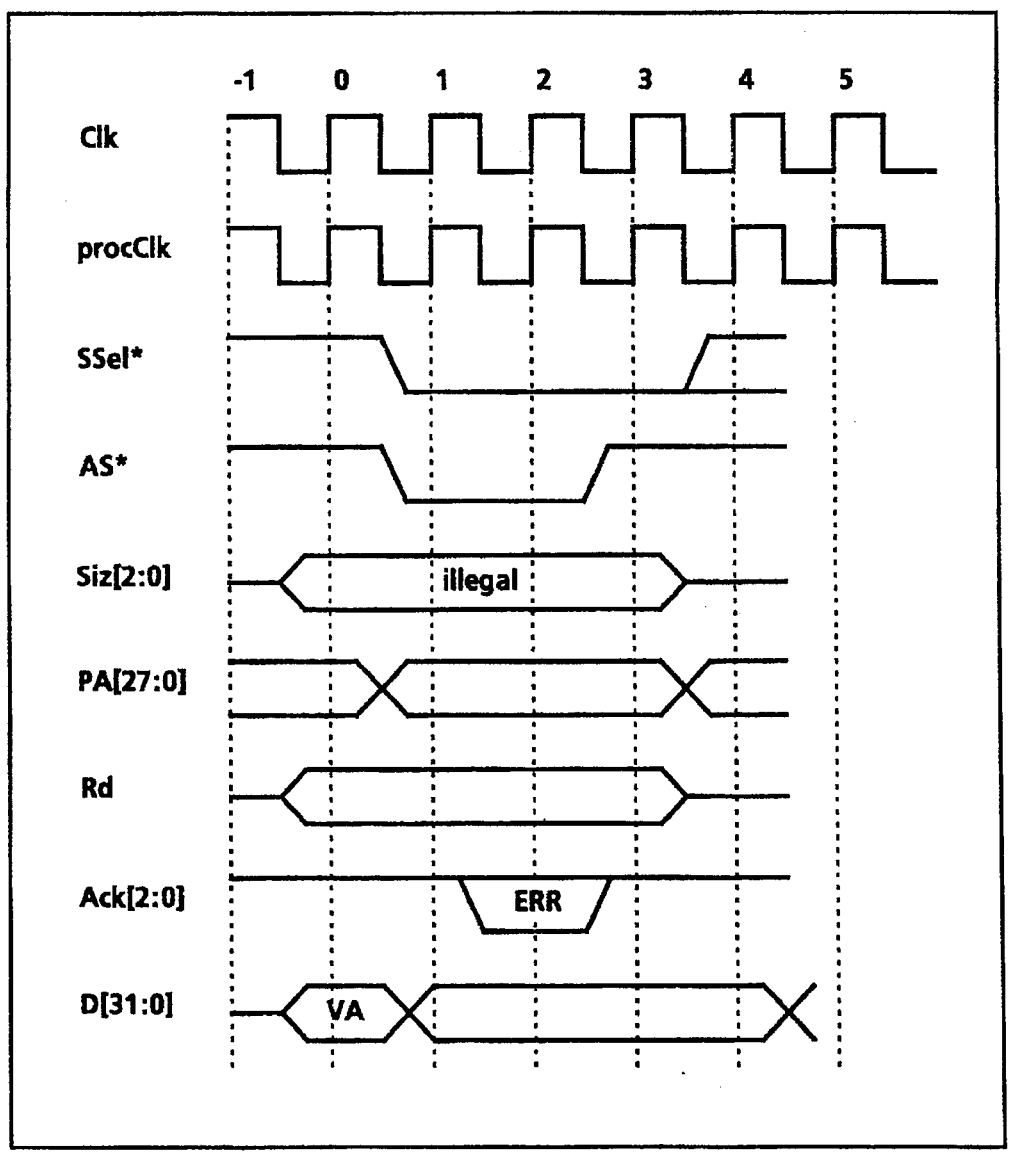
FIG. 10 is a timing diagram showing how the slave sequencer in FIG. 9 responds to signals that include an error.

FIG. 10 illustrates an operation that can be performed by slave sequencer 284 without stopping procClk pulses during the operation. In other words, each pulse on the Clk line during the operation results in a procClk pulse, causing the coprocessor to execute a microinstruction.

During Clk cycle −1, the current bus master begins providing signals on the Siz[2:0] and Rd lines and continues to provide a virtual address VA on D[31:0]. During Clk cycle 0, the host bus control circuitry pulls down the AS* line and the SSel* line of slave sequencer 284. The host bus control circuitry also provides a physical address obtained from VA on PA[27:0] and the current bus master stops providing VA.

In response, slave sequencer 284 determines that the Mock size indicated by the signals on Siz[2:0] is a size that is not supported by slave sequencer 284. Therefore, during Clk cycle 1, slave sequencer 284 begins providing a signal on Ack[2:0] indicating an error. Upon detecting this signal, the host bus control circuitry pulls up the AS* line during Clk cycle 2. Upon detecting the end of the error signal during Clk cycle 2, the host bus control circuitry pulls up SSel* during Clk cycle 3 and stops providing the physical address on PA[27:0]. Similarly, upon detecting the end of the error signal, the current bus master stops providing signals on Siz[2:0] and Rd during Clk cycle 3.

FIGS. 11–15 illustrate operations in which slave sequencer 284 determines that the signals provided during Clk cycle 0 are not in error and therefore performs the requested operation, signalling clock control logic 280 to stop procClk in order to prevent execution of microinstructions. Upon completing each operation, slave sequencer 284 releases clock control logic 280 so that procClk pulses are again provided.

Figure 11:
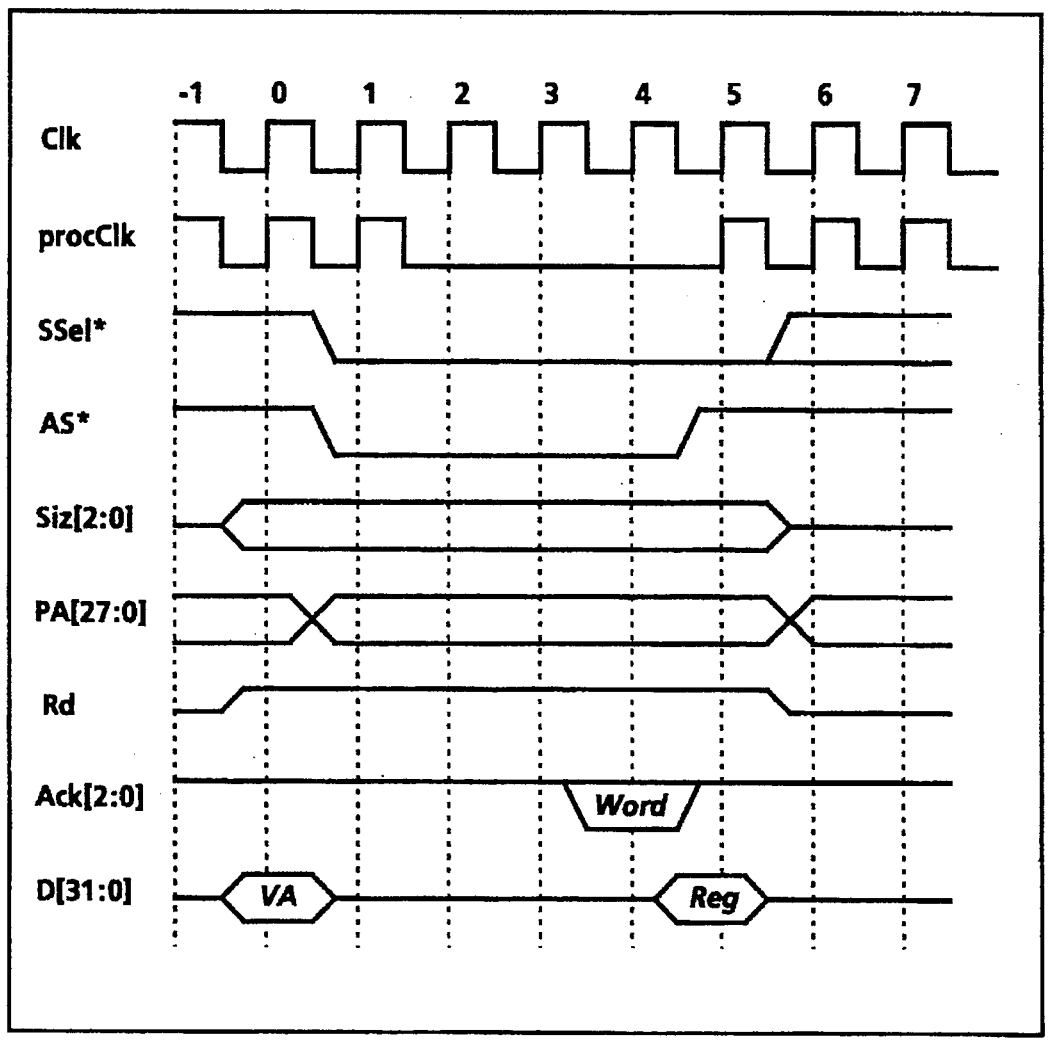
FIG. 11 is a timing diagram showing how the slave sequencer in FIG. 9 responds to signals requesting an operation reading data from the control/status register.

FIG. 11 shows an operation reading the RUN bit in control/status register 168. During Clk cycle 1, slave sequencer 284 signals clock control logic 280 to stop procClk and provides any signals necessary to provide the physical address on PA[27:0] to CS address buffers 180 through address buffers 182. The following occur during Clk cycles 2 and 3: The physical address propagates through CS address buffers 180, which are connected to address control/status register 168; slave sequencer 284 reads Reg, the value of the RUN bit, from control/status register 168; and slave sequencer 284 provides Reg to buffer 184 on the RUN line. During Clk cycle 3, slave sequencer 284 provides signals on Ack[2:0] indicating that a word will be provided. During Clk cycle 4, slave sequencer 284 provides Reg on D[31:0] by providing a control signal to buffer 184. In the same cycle, slave sequencer 284 signals clock control logic 280 to restart procClk so that microinstruction execution can resume.

Upon receiving the word signal on Ack[2:0] at the beginning of Clk cycle 4, the host bus control circuitry pulls up AS* during Clk cycle 4. Similarly, the current bus master responds to the word signal by preparing to handle Reg when it is provided on D[31:0].

Figure 12:
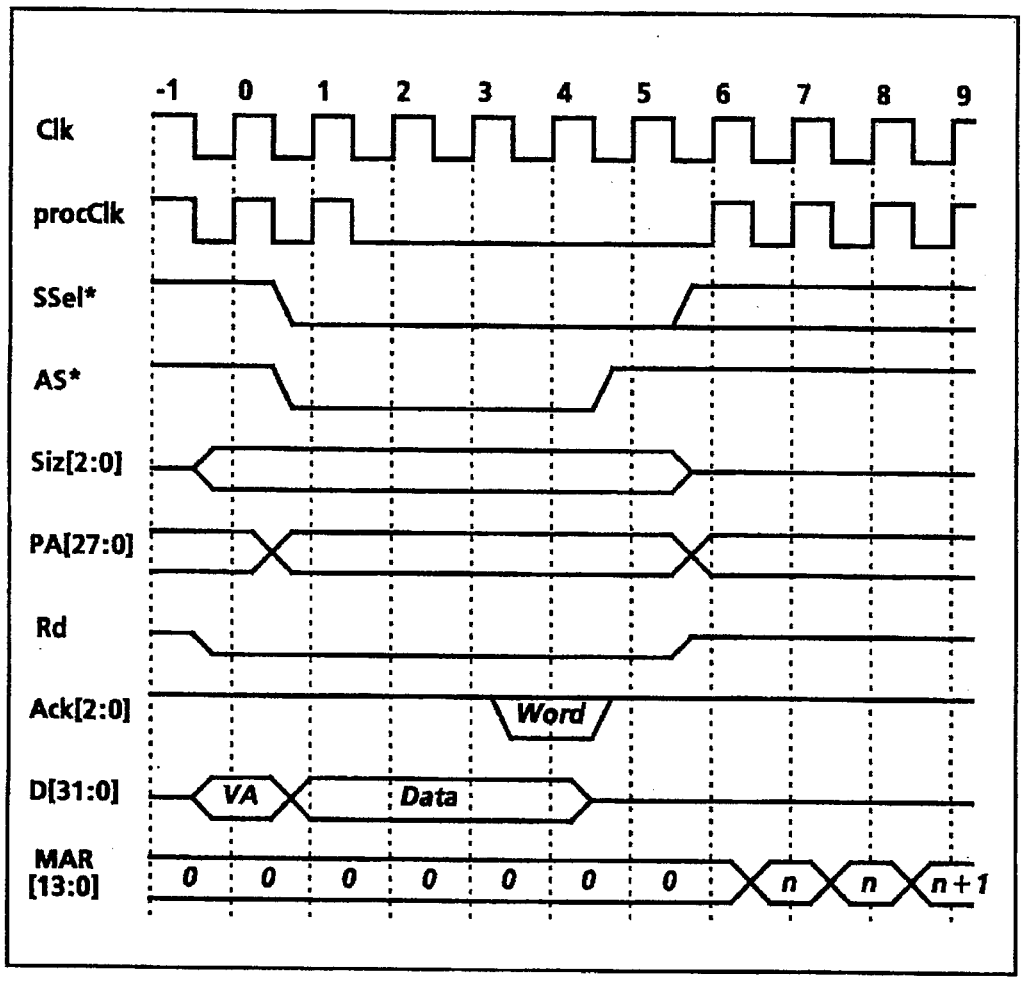
FIG. 12 is a timing diagram showing how the slave sequencer in FIG. 9 responds to signals requesting an operation Writing the RUN bit in the control/status register.

FIG. 12 shows an operation writing control/status register 168, and specifically setting the RUN bit to start execution of a microinstruction routine stored at address n in control store 150. As explained above, the address 0 is loaded into MAR 152 while the RUN bit is not set and is repeatedly provided to control store 150, which provides a no-op microinstruction that is then executed. A similar operation to that shown in FIG. 12 could be used to clear the RUN bit.

During Clk cycle 1, slave sequencer 284 signals clock control logic 280 to stop procClk and provides any signals necessary to provide the physical address on PA[27:0] to CS address buffers 180 through address buffers 182. During the same cycle, the current bus master could begin providing data on D[31:0] to be written into control/status register 168. Slave sequencer 284 can determine from the most significant bit of D[31:0] or, alternatively, from the high order bits of the address on PA[27:0], whether the RUN bit should be set or cleared.

In Clk cycles 2 and 3, slave sequencer 284 provides signals to set or clear the RUN bit in control/status register 168, in accordance with the most significant bit of D[31:0] or the high order bits of the address on PA[27:0]. In Clk cycle 3, slave sequencer 284 provides a word signal on Ack[2:0].

Upon receiving the word signal on Ack[2:0] at the beginning of Clk cycle 4, the host bus control circuitry pulls up AS* during Clk cycle 4. Similarly, the current bus master stops providing data on D[31:0].

During Clk cycle 5, slave sequencer 284 signals clock control logic 280 to restart procClk so that microinstruction execution can resume during Clk cycle 6. Execution of the microinstruction at address 0 now loads the address n into MAR 152, so that the microinstruction at n is fetched in Clk cycle 7 and decoded in Clk cycle 8. Therefore, in Clk cycle 8, a new address can be loaded into MAR 152 under microinstruction control, so that execution of a microinstruction routine has begun.

Figure 13:
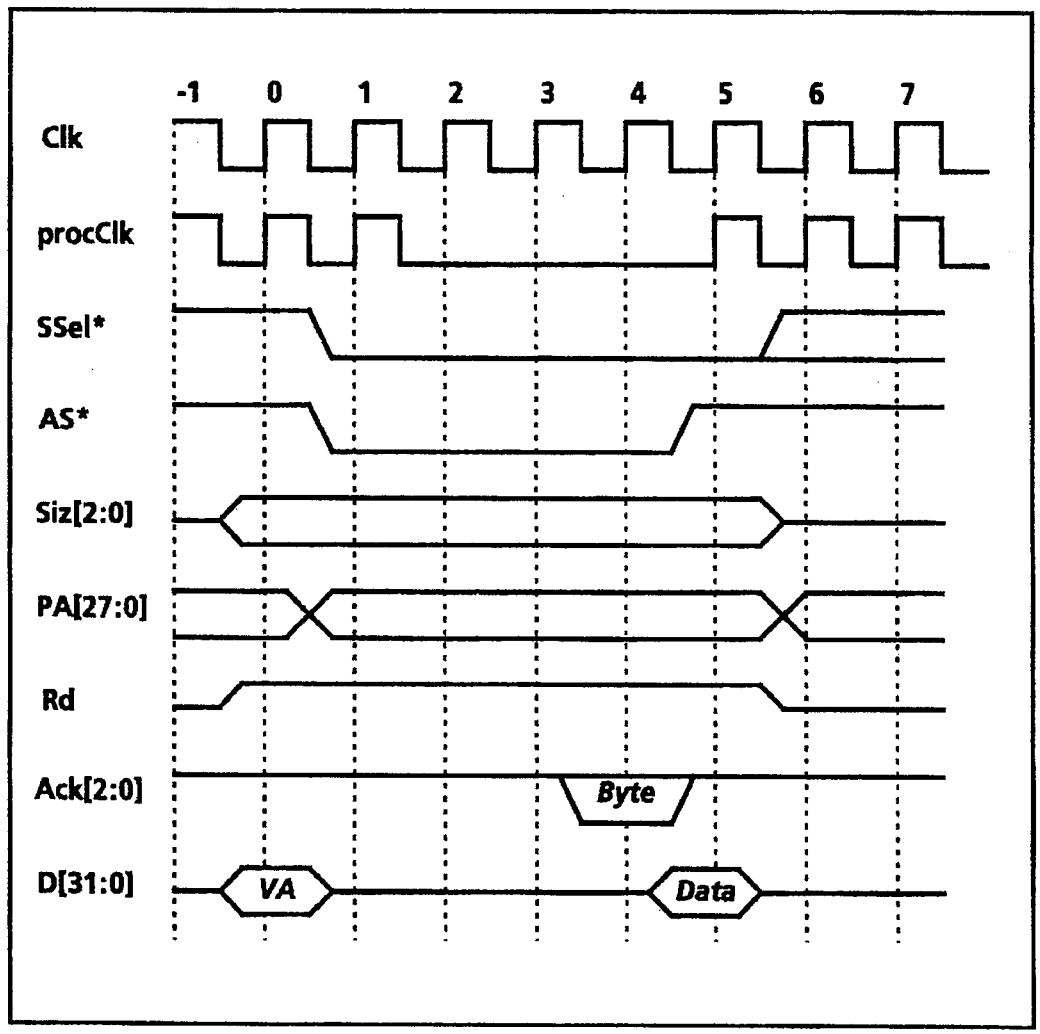
FIG. 13 is a timing diagram showing how the slave sequencer in FIG. 9 responds to signals requesting an operation reading data from the boot PROM.

FIG. 13 shows an operation reading a byte from boot PROM 116, an operation that closely resembles the one shown in FIG. 11. The main differences occur in Clk cycles 2, 3, and 4. In Clk cycles 2 and 3, slave sequencer 284 provides an output enable signal to boot PROM 116 so that the address from address buffers 182 can propagate through boot PROM 116 and read out a byte. In Clk cycle 3, slave sequencer 284 provides signals on Ack[2:0] indicating that a byte will be provided. During Clk cycle 4, slave sequencer 284 provides the byte on D[31:0] by providing a clock signal to buffer 184. In the same cycle, slave sequencer 284 signals clock control logic 280 to restart procClk so that microinstruction execution can resume.

Upon receiving the byte signal on Ack[2:0] at the beginning of Clk cycle 4, the host bus control circuitry pulls up AS* during Clk cycle 4. Similarly, the current bus master, ordinarily the host CPU during boot time, responds to the byte signal by preparing to handle the byte when it is provided on D[31:0].

Figure 14:
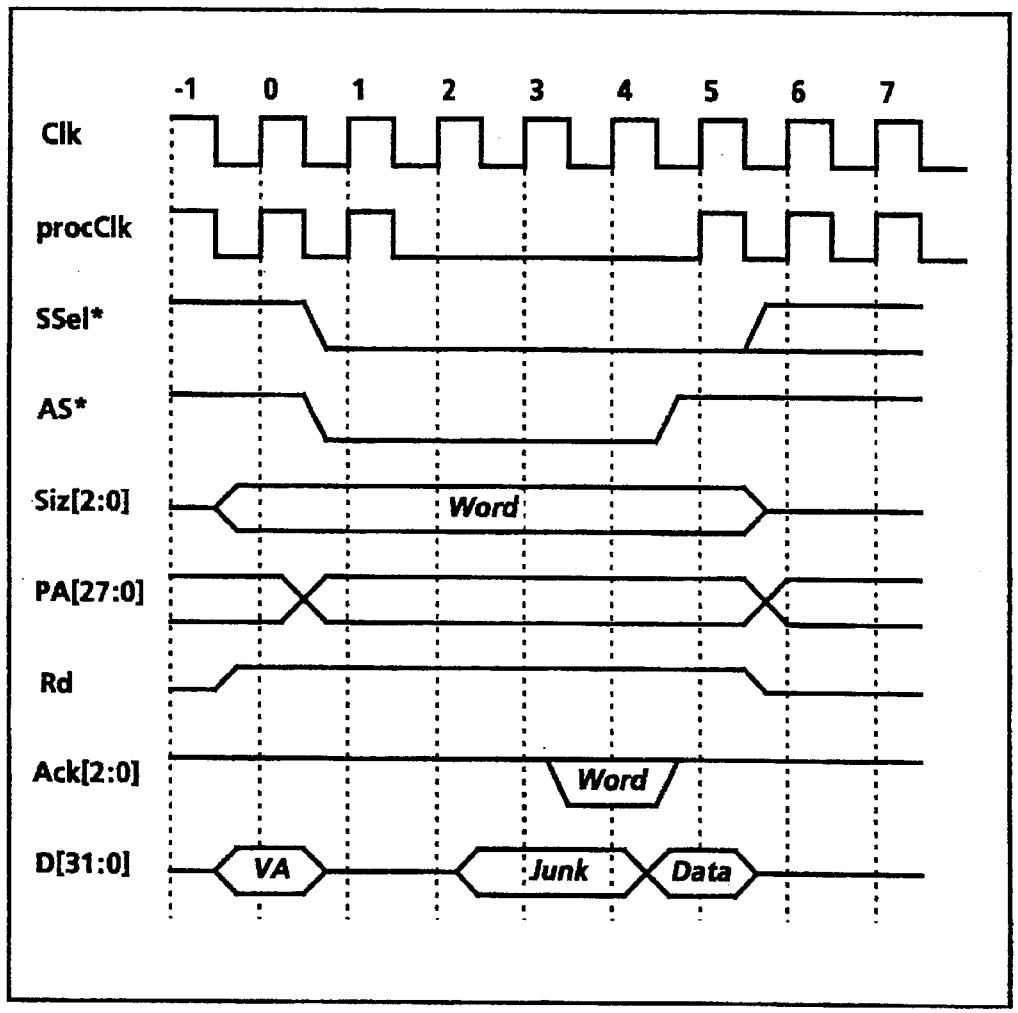
FIG. 14 is a timing diagram showing how the slave sequencer in FIG. 9 responds to signals requesting an operation reading data from the control store.

FIG. 14 shows an operation reading a word from control store 150, as indicated by the signals provided by the current bus master on Siz[2:0] beginning in Clk cycle 0. During Clk cycle 1, slave sequencer 284 signals clock control logic 280 to stop procClk and provides any signals necessary to provide the physical address on PA[27:0] to CS address buffers 180 through address buffers 182. In Clk cycle 2, slave sequencer 284 provides an output enable signal to CS address buffers 180 so that the physical address is provided to control store 150 during Clk cycle 3.

In each of Clk cycles 2 through 4, slave sequencer 284 provides control signals to SBus register 188 and SBus buffer 190 so that whatever data is in the pipeline is transfered to D[31:0]; the data provided during Clk cycles 2 and 3 and during similar cycles in other drawings is referred to as junk because it is not certain to be useful data. During Clk cycles 3 and 4, a word read from control store 150 in response to the physical address in CS address buffers 180 is transferred through the appropriate one of transceivers 124 to SBus register 188, and then through SBus buffer 190 so that it is certain to have reached D[31:0] by the end of Clk cycle 4.

During Clk cycle 3, slave sequencer 284 provides control signals to store the word to SBus register 188 and also provides signals on Ack[2:0] indicating that a word will be provided. During Clk cycle 4, slave sequencer 284 signals clock control logic 280 to restart procClk so that microinstruction execution can resume.

Upon receiving the word signal on Ack[2:0] at the beginning of Clk cycle 4, the host bus control circuitry pulls up AS* during Clk cycle 4. Similarly, the current bus master responds to the word signal by preparing to handle a word when it is provided on D[31:0].

Figure 15:
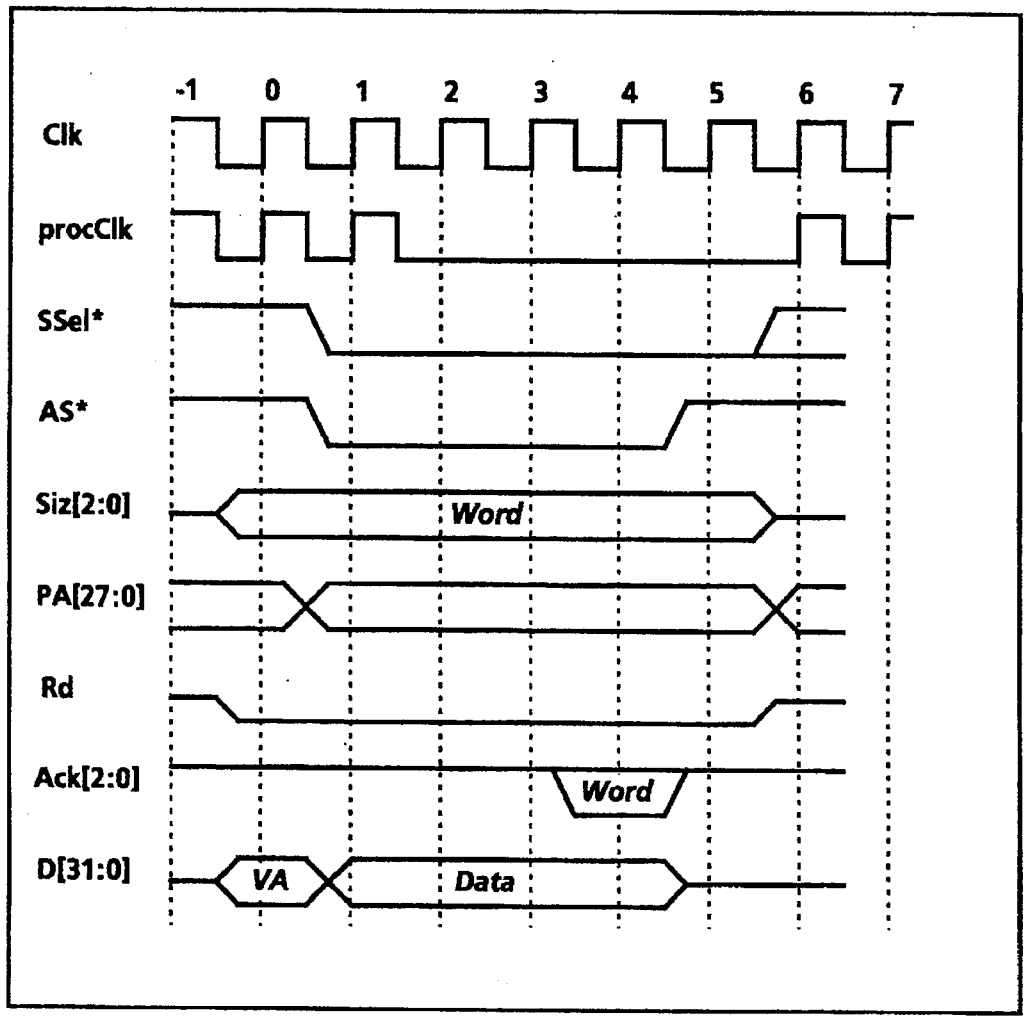
FIG. 15 is a timing diagram showing how the slave sequencer in FIG. 9 responds to signals requesting an operation writing data to the control store.

FIG. 15 shows an operation writing a word to control store 150. During Clk cycle 1, slave sequencer 284 signals clock control logic 280 to stop procClk and provides any signals necessary to provide the physical address on PA[27:0] to CS address buffers 180 through address buffers 182. During the same cycle, the current bus master begins providing a word to be written into control store 150 on D[31:0].

In Clk cycle 2, slave sequencer 284 provides an output enable signal to CS address buffers 180 so that the physical address is provided to control store 150. During the same cycle, slave sequencer 284 also provides control signals to store the word on D[31:0] in SBus register 188.

During Clk cycle 3, slave sequencer 284 provides signals on Ack[2:0] indicating that a word is being written. During Clk cycle 4, slave sequencer 284 provides a signal to write enable control store 150 and also provides signals to transfer the word to be written through the appropriate one of transceivers 124 to control store 150, so that the word is written.

Upon receiving the word signal on Ack[2:0] at the beginning of Clk cycle 4, the host bus control circuitry pulls up AS* during Clk cycle 4. Similarly, the current bus master stops providing the word on D[31:0].

During Clk cycle 5, slave sequencer 284 provides an output enable signal so that an address from MAR 152 is provided to control store 150 in preparation for fetching the next microinstruction. During the same cycle, slave sequencer 284 signals clock control logic 280 to restart procClk so that microinstruction execution can resume during Clk cycle 6.

b. Single Word Master Operations

Figure 16:
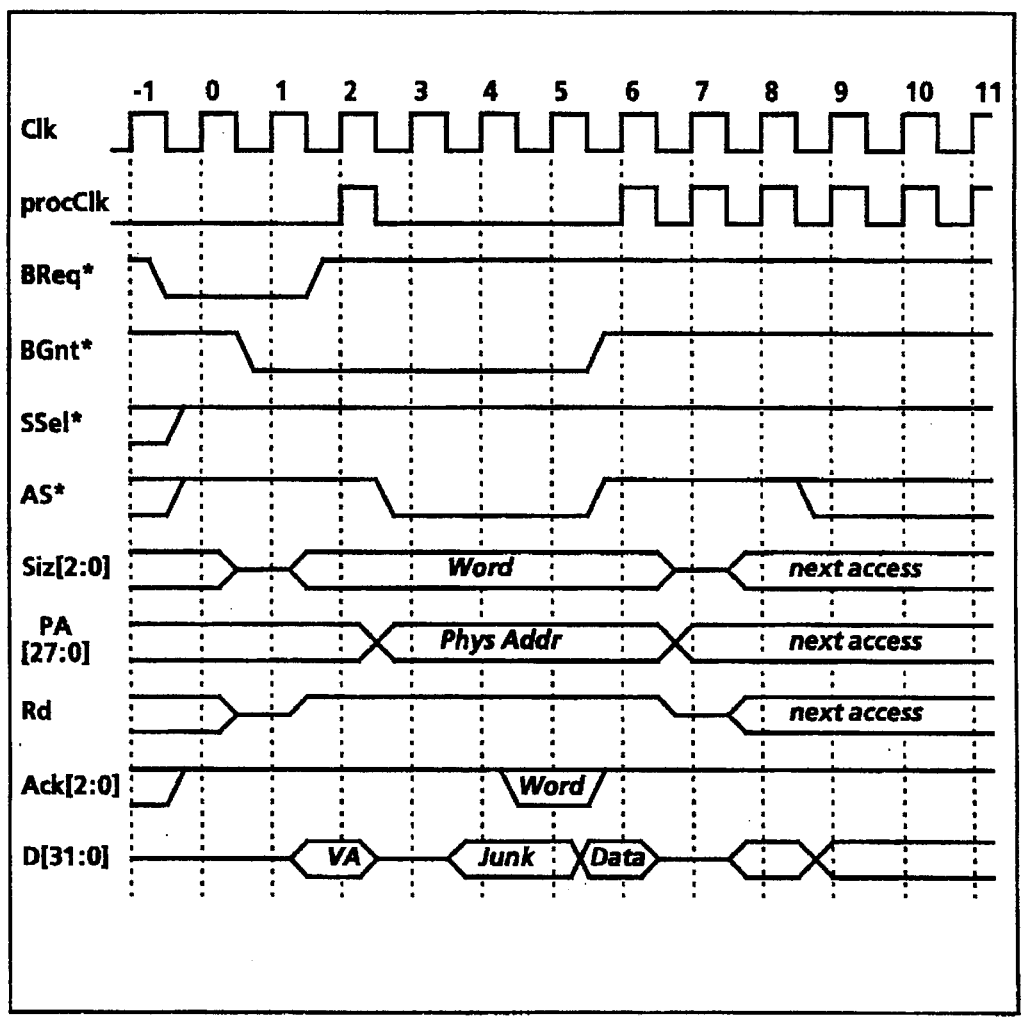
FIG. 16 is a timing diagram showing how the DVMA sequencer in FIG. 8 responds to signals requesting a DMA operation reading data from host memory.

FIG. 16 shows a DMA operation reading a word from a slave in response to signals from register and decode 154. In Clk cycle −2 (not shown), register and decode 154 can complete operations that transfer a virtual address VA for the word to be read through registered transceiver 194 to SBus register 196. In the same cycle, register and decode 154 can provide signals requesting the operation to DVMA sequencer 282. In response, DVMA sequencer 282 immediately signals clock control logic 280 to stop procClk, so that execution of microinstructions is halted until another procClk pulse is necessary for DVMA sequencer 282 to continue performing the requested operation. Therefore, procClk is not pulsed during Clk cycle −1.

During Clk cycle −1, DVMA sequencer 282 pulls its BReq* line low to request control of SBus 102. In response, the SBus control circuitry pulls the BGnt* line of DVMA sequencer 282 down during Clk cycle 0, granting bus control. In some cases, additional cycles may occur before the BGnt* signal.

Upon receiving the BGnt* signal, DVMA sequencer 282 begins performing the operation requested by register and decode 154. In Clk cycle 1, DVMA sequencer 282 provides a word signal on Siz[2:0] and a read signal on Rd. Also, DVMA sequencer 282 provides a control signal to SBus buffer 198 so that VA from SBus register 196 is provided on D[31:0]. Then, DVMA sequencer 282 signals clock control logic 282 to restart procClk, so that one procClk pulse occurs during Clk cycle 2 so that the next microinstruction is executed. In executing this microinstruction, register and decode 154 provides signals that change the direction in which data is transferred through SBus register 196 and registered transceiver 194, so that data can be received from SBus 102 through SBus buffer 198.

In FIG. 16, the SBus control circuitry translates VA into a physical address immediately and provides the physical address on PA[27:0] during Clk cycle 2. In some cases, additional cycles may occur before the physical address is provided. To indicate that the physical address is now available, the SBus control circuitry also pulls down AS* during Clk cycle 2.

In response to AS*, DVMA sequencer 282 provides a control signal to SBus buffer 198 during Clk cycles 3, 4, and 5 so that VA is no longer provided on D[31:0]. As a result, when the slave provides a word signal on Ack[2:0] during Clk cycle 4, the word on D[31:0] can propagate to SBus register 196 during Clk cycle 5. The SBus control circuitry responds to the word signal by pulling up the BGnt* and AS* lines, which is acceptable because DVMA sequencer 282 no longer needs SBus 102.

DVMA sequencer 282 responds to the word signal by signalling clock control logic 282 to restart procClk so that a sequence of microinstructions can be executed to receive and transfer the word to its destination. Register and decode 154 executes a microinstruction in Clk cycle 6 that provides signals so that the word is stored in SBus register 196 before it is withdrawn from D[31:0]. Subsequent microinstructions can transfer the word through registered transceivers 194 and 122 to a set of processing units.

Figure 17:
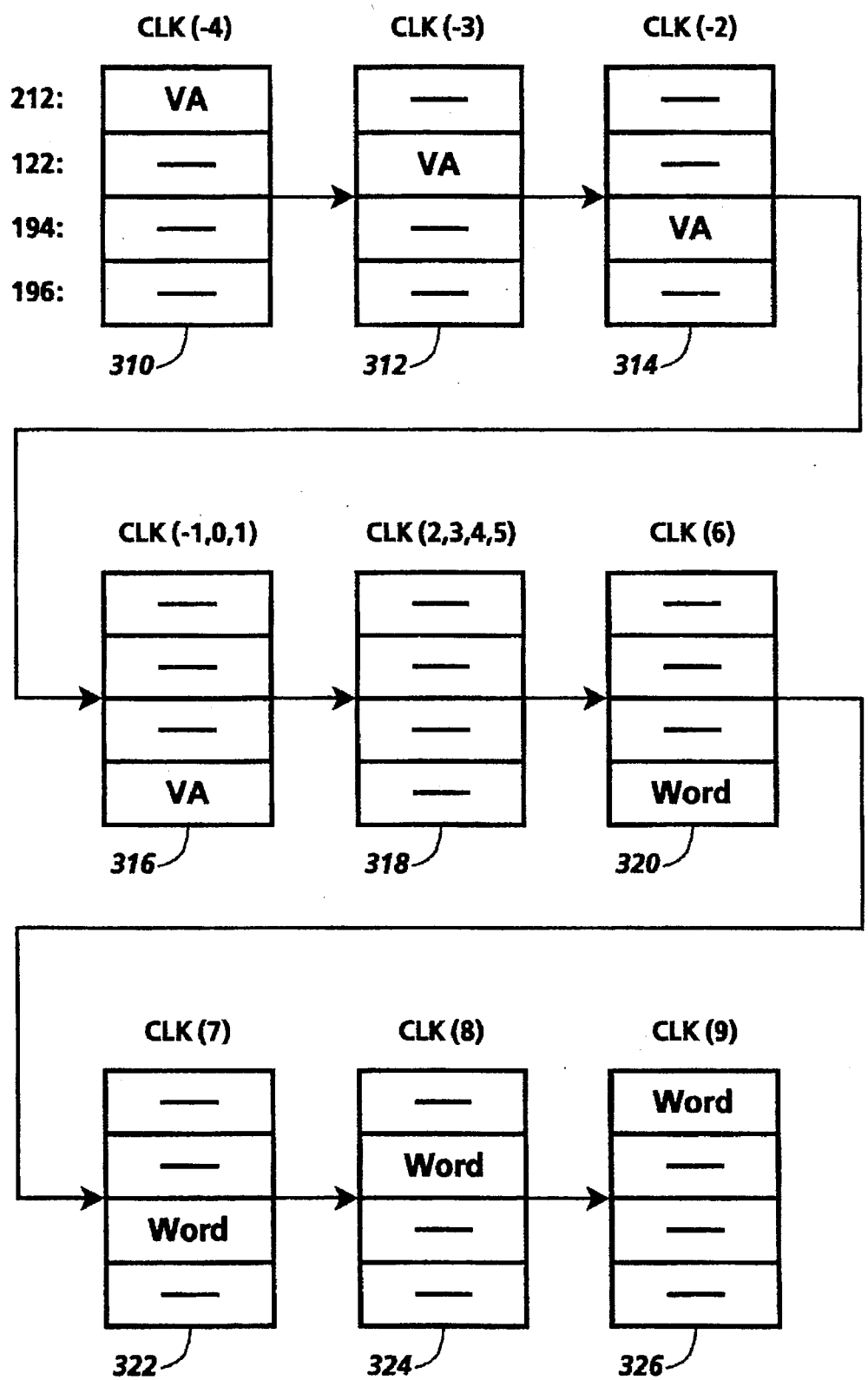
FIG. 17 is a schematic flow diagram showing movement of data through pipeline register circuitry during the operation in FIG. 16.

FIG. 17 shows a snapshot of a pipeline of registers at the end of each of several Clk cycles in FIG. 16. In each snapshot, the pipeline extends from one or more of the processing units at the upper end to SBus 102 at the lower end. The uppermost stage of the pipeline represents registered transceiver 212 of a processing unit; the second stage represents registered transceiver 122; the third stage represents registered transceiver 194; and the lowest stage represents SBus register 196. Data that is not of interest to the operation in FIG. 16 is shown as a dash ("—").

In snapshot 310, occurring somewhat before Clk cycle –2, such as in Clk cycle –4, the virtual address VA is in registered transceiver 212 of one of the processing units. In snapshots 312 and 314, VA has been transferred to registered transceiver 122 and then to registered transceiver 194, bringing the pipeline to its state at the end of Clk cycle –2 in FIG. 16.

Snapshot 316 shows the pipeline after Clk cycle –1, with VA in SBus register 196. Then, by the end of Clk cycle 2, VA is no longer stored, so that the pipeline contains no data relevant to the operation in FIG. 16, as shown by shapshot 318.

Snapshot 320 shows the pipeline after Clk Cycle 6, with a word of data from SBus 102 stored in SBus register 196. Snapshots 322, 324, and 326 show how the word is transferred in Clk cycles 7, 8, and 9 so that it reaches registered transceiver 212 of all of the processing units. In Clk cycle 10, the word can be written into SRAM 240 of each of a set of processing units, completing the operation.

Several of the stages shown in FIG. 17 can occur as a result of executing a respective microinstruction. For example, snapshots 310, 312, 314, 316 occur as a result of microinstructions executed in cycles that precede Clk cycle –1 in FIG. 16 and snapshots 320, 322, 324, and 326 occur as a result of microinstructions executed in Clk cycles 6, 7, 8, and 9, respectively. Snapshot 318 does not explicitly show any effects of microinstruction execution, but the microinstruction executed in Clk cycle 2 has an effect on the subsequent direction of data transfer, as described above.

Figure 18:
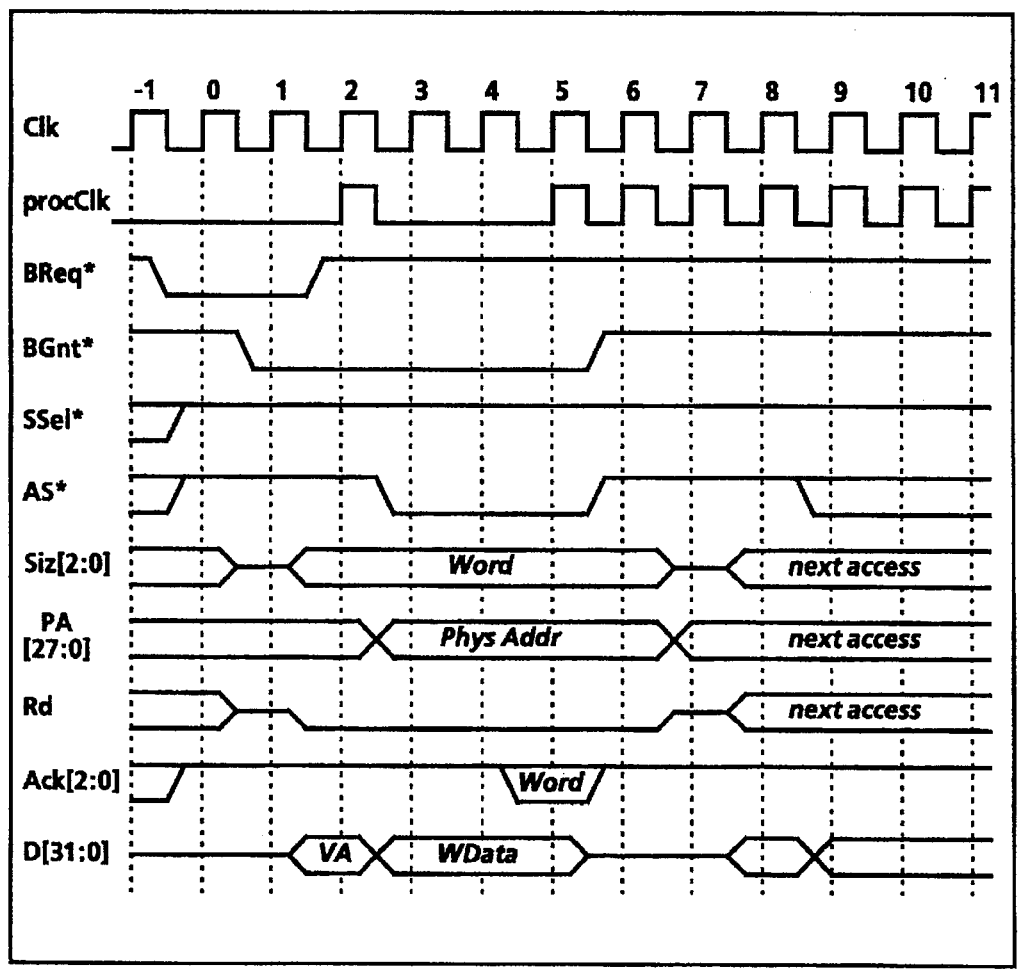
FIG. 18 is a timing diagram showing how the DVMA sequencer in FIG. 8 responds to signals requesting a DMA operation writing data from host memory.

FIG. 18 shows a DMA operation writing a word in response to signals from register and decode 154. In Clk cycle –2 (not shown), register and decode 154 can complete operations that transfer a virtual address VA for the word to be written through registered transceiver 194 to SBus register 196 and that transfer the word to be written through registered transceiver 122 to registered transceiver 194. In the same cycle, register and decode 154 can provide signals requesting the operation to DVMA sequencer 282. In response, DVMA sequencer 282 immediately signals clock control logic 280 to stop procClk, so that execution of microinstructions is halted until another procClk pulse is necessary for DVMA sequencer 282 to continue performing the requested operation. Therefore, procClk is not pulsed during Clk cycle –1.

During Clk cycle –1, DVMA sequencer 282 pulls its BReq* line low to request control of SBus 102. In response, the SBus control circuitry pulls the BGnt* line of DVMA sequencer 282 down during Clk cycle 0, granting bus control. In some cases, additional cycles may occur before the BGnt* signal.

Upon receiving the BGnt* signal, DVMA sequencer 282 begins performing the operation requested by register and decode 154. In Clk cycle 1, DVMA sequencer 282 provides a word signal on Siz[2:0] and a read signal on Rd. Also, DVMA sequencer 282 provides a control signal to SBus buffer 198 so that VA from SBus register 196 is provided on D[31:0]. Then, DVMA sequencer 282 signals clock control logic 282 to provide one procClk pulse during Clk cycle 2 so that the next microinstruction is executed. In executing this microinstruction, register and decode 154 provides signals that advance the word to be written from registered transceiver 194 to SBus register 196, so that the word to be written can be provided to SBus 102 through SBus buffer 198.

In FIG. 18, the SBus control circuitry translates VA into a physical address immediately and provides the physical address on PA[27:0] during Clk cycle 2. In some cases, additional cycles may occur before the physical address is provided. To indicate that the physical address is now available, the SBus control circuitry also pulls down AS* during Clk cycle 2.

When the slave provides a word signal on Ack[2:0] during Clk cycle 4 indicating the word data has been received, DVMA sequencer 282 stops providing the word of data in Clk cycle 5. The SBus control circuitry also responds to the word signal by pulling up the BGnt* and AS* lines, which is acceptable because DVMA sequencer 282 no longer needs SBus 102.

DVMA sequencer 282 also responds to the word signal by signalling clock control logic 282 to restart procClk so that normal execution of microinstructions can begin again in Clk cycle 5. Since the slave no longer needs Siz[2:0] and PA[27:0], the signals on those lines are withdrawn in cycle 6.

Figure 19:
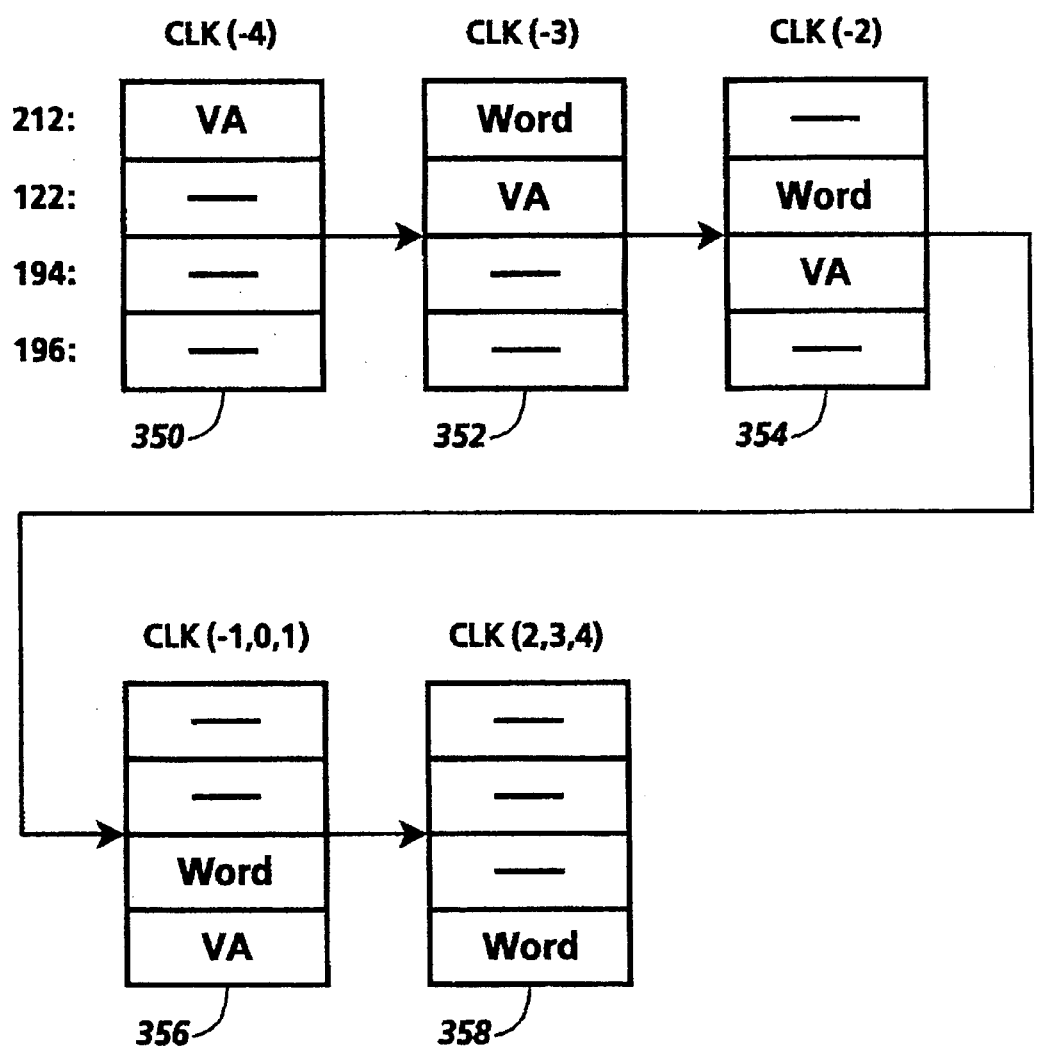
FIG. 19 is a schematic flow diagram showing movement of data through pipeline register circuitry during the operation in FIG. 18.

FIG. 19 shows a snapshot of a pipeline of registers at the end of each of several Clk cycles in FIG. 18.

In snapshot 350, occurring somewhat before Clk cycle –2, such as in Clk cycle –4, the virtual address VA is in registered transceiver 212 of one of the processing units. In snapshot 352, which can be in Clk cycle –3, VA has been transferred to registered transceiver 122 and the word of data to be written is in registered transceiver 212 of one of the processing units. In snapshot 354, VA has been further transferred to registered transceiver 194 and the word of data to registered transceiver 122, bringing the pipeline to its state at the end of Clk cycle –2 in FIG. 18.

Snapshot 356 shows the pipeline after Clk cycle –1, with VA in SBus register 196 and the word of data in registered transceiver 194. Then, by the end of Clk cycle 2, the word of data is in SBus register 196 so that it can be provided to SBus 102, as shown by shapshot 358.

Single word DMA read and write operations as in FIGS. 16–19 can be used, for example, during debugging to transfer a kernel or other specific data between one or more processing units and host memory or another memory device.

Also, single word DMA read and write operations as in FIGS. 16–19 can be combined with slave operations as in FIGS. 14 and 15 to transfer data between processing units and host CPU or another bus master through control store 150; in other words, slave sequencer 284 can be the slave to or from which a DMA read or write operation is performed. In general, slave sequencer 284 can signal clock control logic 280 to stop procClk in any Clk cycles during which slave sequencer 284 is reading from or writing to control store 150. During other Clk cycles, master sequencer 282 can signal clock control logic to restart procClk as necessary to perform master operations.

Similarly, a single word DMA write operation as in FIGS. 18 and 19 can be combined with a slave operation resembling that in FIG. 12 to clear the RUN bit, so that the coprocessor can in effect halt itself. In other words, register and decode 154 would sense the cleared RUN bit and respond by executing no-op instructions.

Single word DMA read and write operations are not efficient, however, for transfers of images because such transfers typically involve a large number of words.

c. Multiple Word Master Operations

FIGS. 20–25 illustrate multiple word DMA reads and writes. These operations, also referred to as block transfers or burst transfers, can be very useful in transferring data defining part or all of an image.

Figure 20:
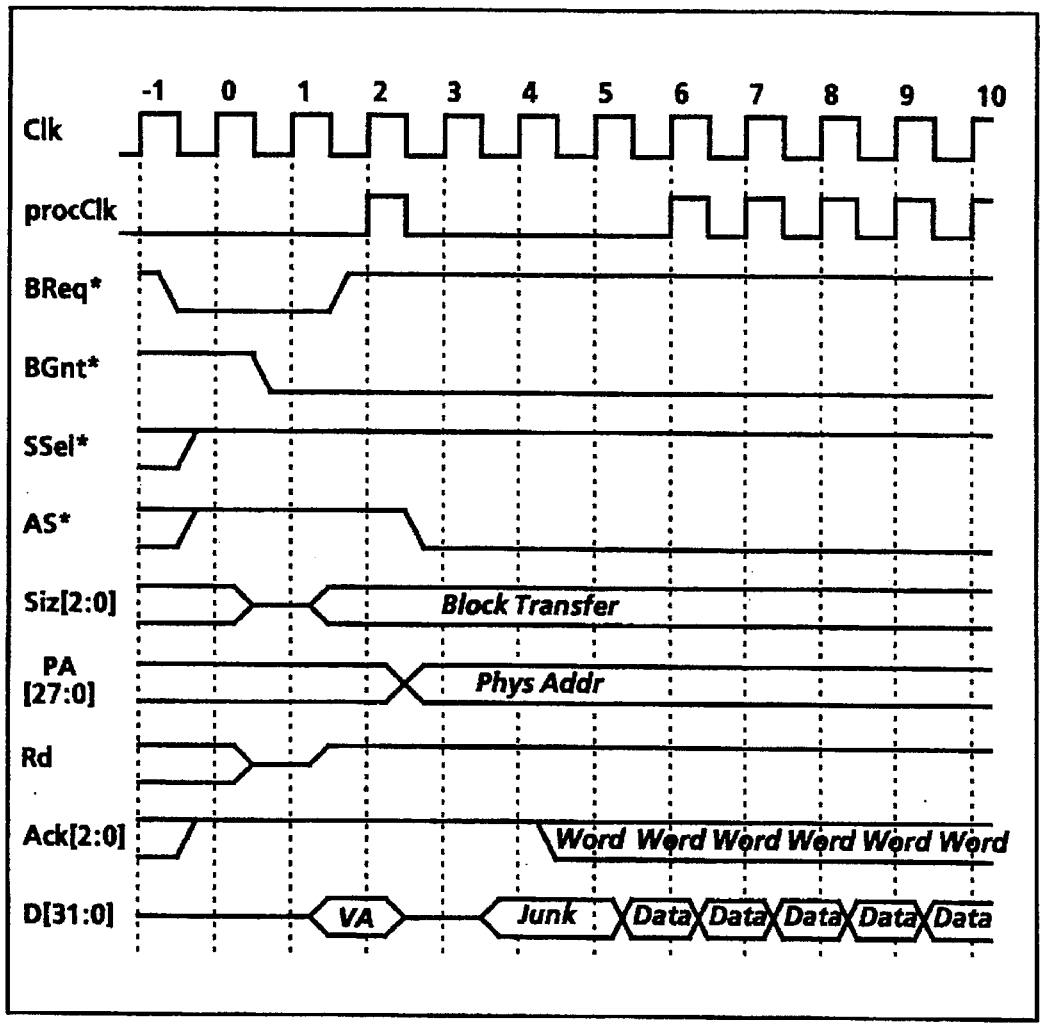
FIG. 20 is a timing diagram showing how the DVMA sequencer in FIG. 8 begins to respond to signals requesting a DMA operation reading multiple words.
Figure 21:
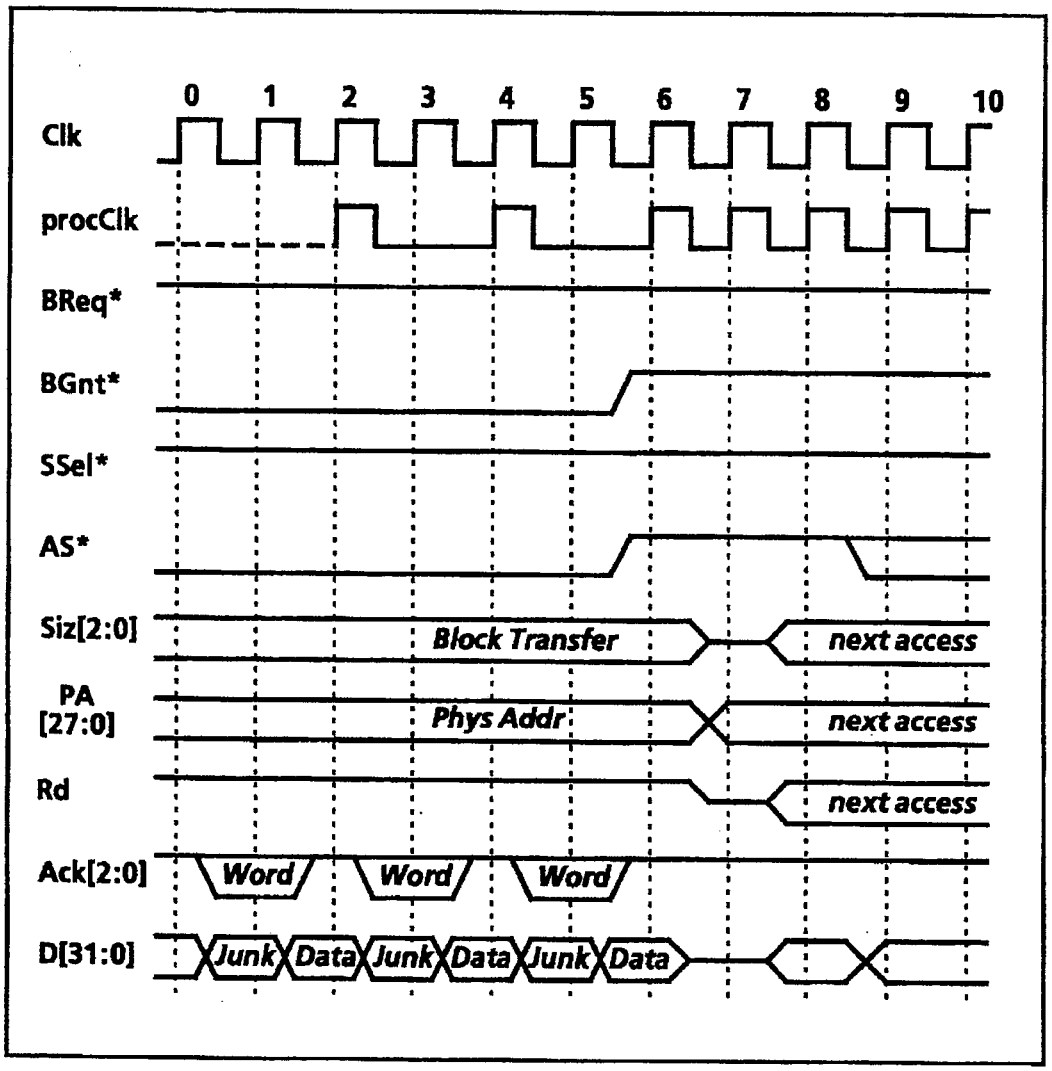
FIG. 21 is a timing diagram showing how the DVMA sequencer in FIG. 8 finishes responding to signals requesting a DMA operation reading multiple words.

FIGS. 20 and 21 show, respectively, the beginning and the end of a DMA operation reading multiple words from a slave in response to signals from register and decode 154. The first several cycles of FIG. 20, through Clk cycle 4, are the same as FIG. 16, except that the virtual address VA indicates which word in the block of words is to be transferred first.

Because a block transfer is indicated by Siz[2:0], the slave responds by providing a series of words of data. The slave can, for example, provide one word on each cycle, as shown beginning in Clk cycle 5 in FIG. 20. The slave could alternatively provide one word every alternate cycle as shown in FIG. 21. In either case, the slave would continue until the multiple word transfer is complete, as shown in Clk cycle 6 in FIG. 21. More generally, almost any other number of clock cycles between data words is acceptable to permit a slave to provide or absorb data, except that a transaction may be terminated by bus control circuitry if too long. A master must be able to provide another word whenever a slave provides a signal on lines Ack[2:0].

During each of Clk cycles 6–10 in FIG. 20 and Clk cycles 2, 4, and 6 in FIG. 21, clock control logic 280 responds to signals from DVMA sequencer 282 by providing a procClk pulse and register and decode 154 executes a microinstruction. In executing these microinstructions, register and decode 154 provides signals to store each word of data from D[31:0] in SBus register 196 and to advance words of data along the pipeline to the processing units. During Clk cycles 1, 3, and 5 in FIG. 21, on the other hand, DVMA sequencer 282 signals clock control logic 280 to stop procClk.

As a result, when the slave provides the final word signal on Ack[2:0] during Clk cycle 4 in FIG. 21, the SBus control circuitry responds to the word signal by pulling up the BGnt* and AS* lines, which is acceptable because DVMA sequencer 282 no longer needs SBus 102. DVMA sequencer 282 signals clock control logic 280 to restart procClk so that microinstructions are executed during Clk cycles 6–10 to complete the transfer of words of data to the processing units.

Figure 22:
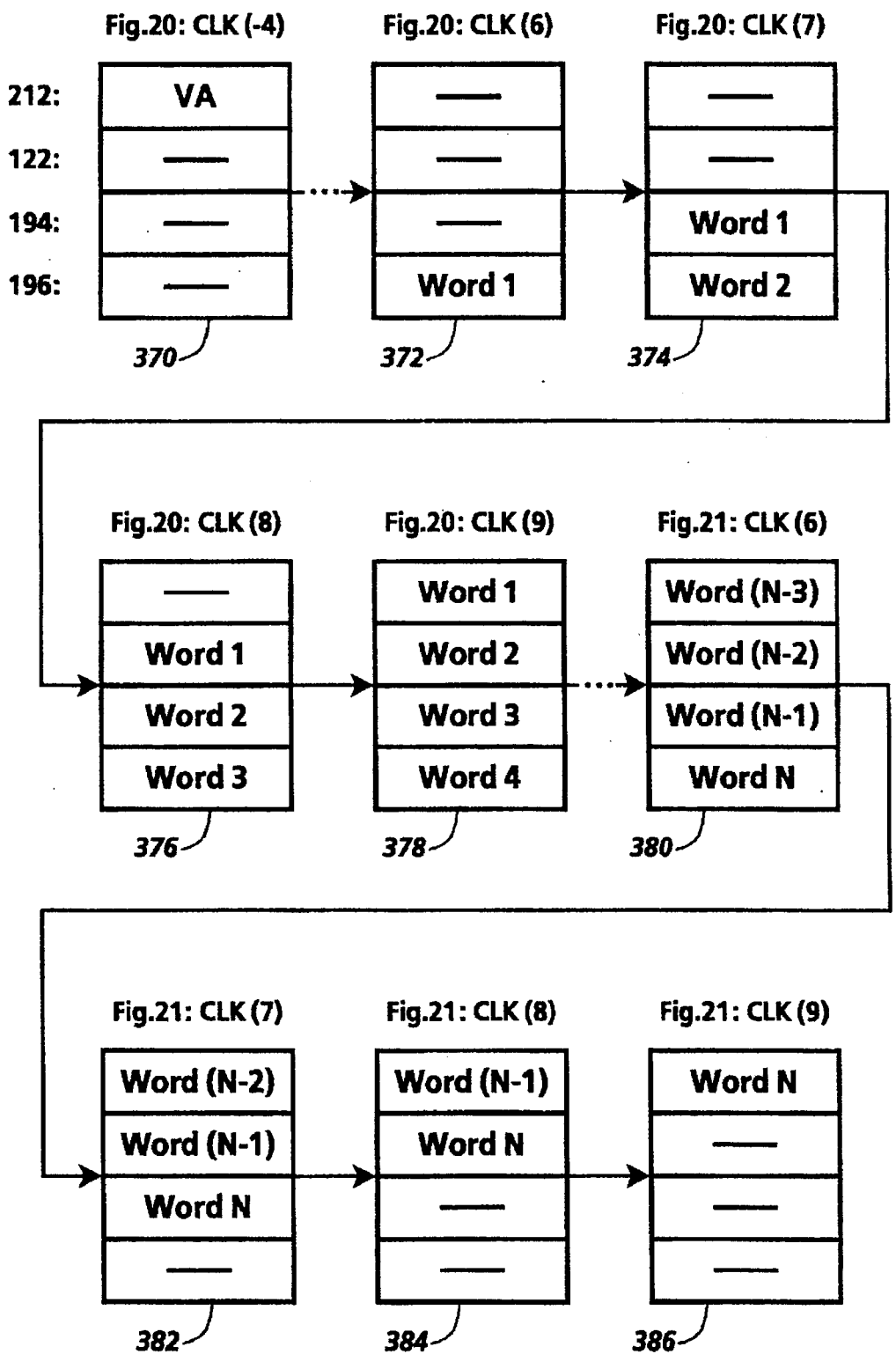
FIG. 22 is a schematic flow diagram showing movement of data through pipeline register circuitry during the operations in FIG. 20 and 21.

FIG. 22 shows a snapshot of a pipeline of registers at the end of each of several Clk cycles in FIGS. 20 and 21. Snapshots 370 and 372 are the same, respectively, as snapshots 310 and 324 in FIG. 17. In snapshot 374, showing the pipeline after Clk cycle 7 in FIG. 20, the first word of data is stored in registered transceiver 194 and the second word of data is stored in SBus register 196. Similarly, snapshots 376 and 378 show the pipeline after Clk cycles 8 and 9, respectively, in FIG. 20, at which point the pipeline is filled with words of data. Beginning after Clk cycle 9, a word of data stored in each processing unit's registered transceiver 212 can be stored in SRAM 240 of each of a set of processing units. For example, register and decode 154 can execute a microinstruction in each Clk cycle and provide a write enable signal to only one processing unit's SRAM 240 in each cycle so that the words of data are evenly distributed, with one word of data stored in each processing unit.

If the slave provides a word on every Clk cycle, DVMA sequencer 282 can signal clock control logic 280 to provide a procClk pulse on every Clk cycle to keep the pipeline full, as illustrated in FIG. 20. If the slave provides a word of data on alternating Clk cycles, DVMA sequencer 282 can signal clock control logic 280 to provide a procClk pulses on alternating Clk cycles so that a word of data from D[31:0] is stored in SBus register 196 on alternating Clk cycles, keeping the pipeline full, as illustrated in FIG. 21. In general, DVMA sequencer 282 responds to a signal on Ack[2:0] from a slave indicating a word is present on lines D[31:0] by signaling clock control logic 280 to provide a procClk pulse, so that DVMA sequencer 282 can handle words at whatever rhythm the slave provides them.

Snapshot 380 shows the pipeline after Clk cycle 6 in FIG. 21, with the last word of data from the slave, word N, stored in SBus register 196. Snapshots 382, 384, and 386 show the pipeline after Clk cycles 7, 8, and 9, respectively, in FIG. 21, showing how word N reaches registered transceiver 212, from which it can be stored in SRAM 240 to complete the multiple word read operation. As described above, the words of data can be evenly distributed, with one word stored in SRAM 240 of each processing unit.

Because of the limited time available to store multiple words from a slave, it is ordinarily not possible to perform operations on words in a multiple word transfer until the transfer is completed. If it were possible, however, it would be advantageous to be able to reduce or otherwise process an image as it is read or to compare an image as it is read with a previously stored image.

Figure 23:
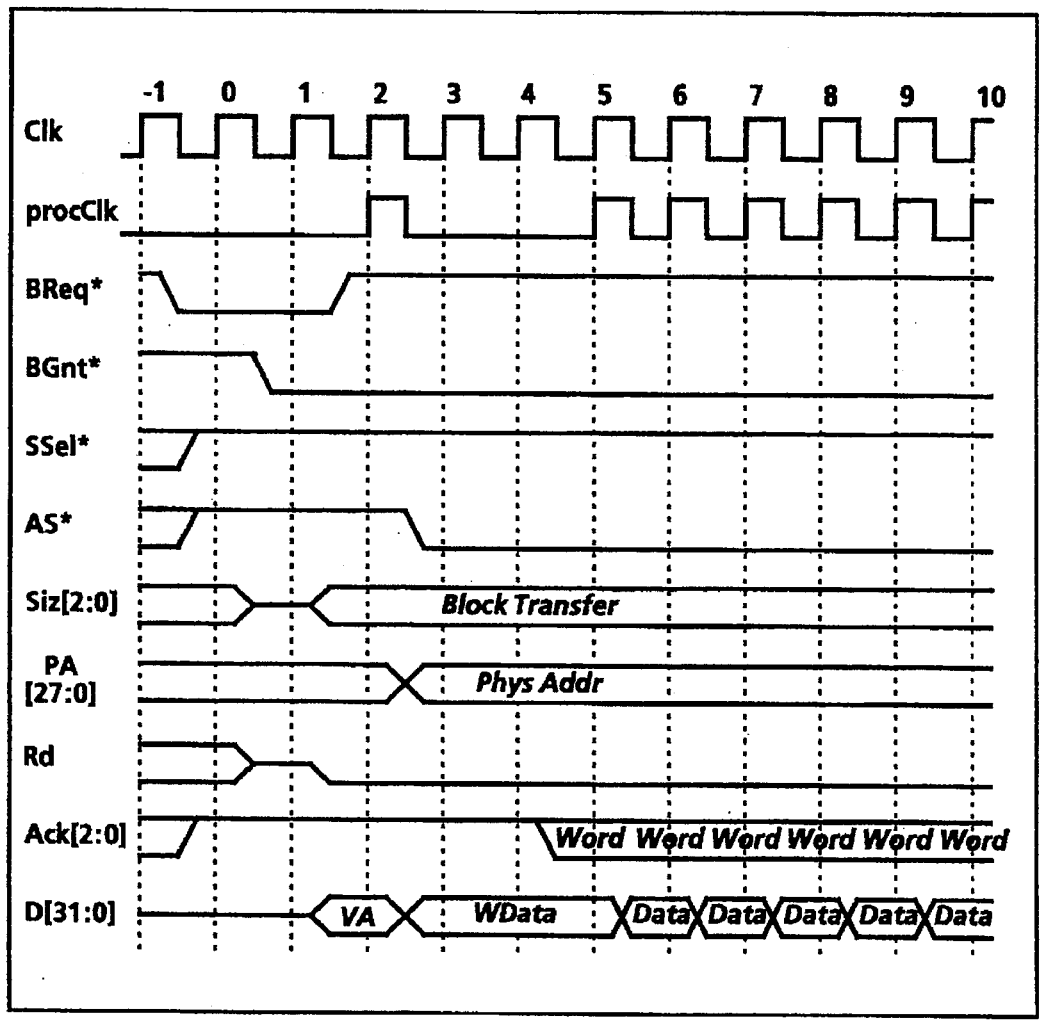
FIG. 23 is a timing diagram showing how the DVMA sequencer in FIG. 8 begins to respond to signals requesting a DMA operation writing multiple words.
Figure 24:
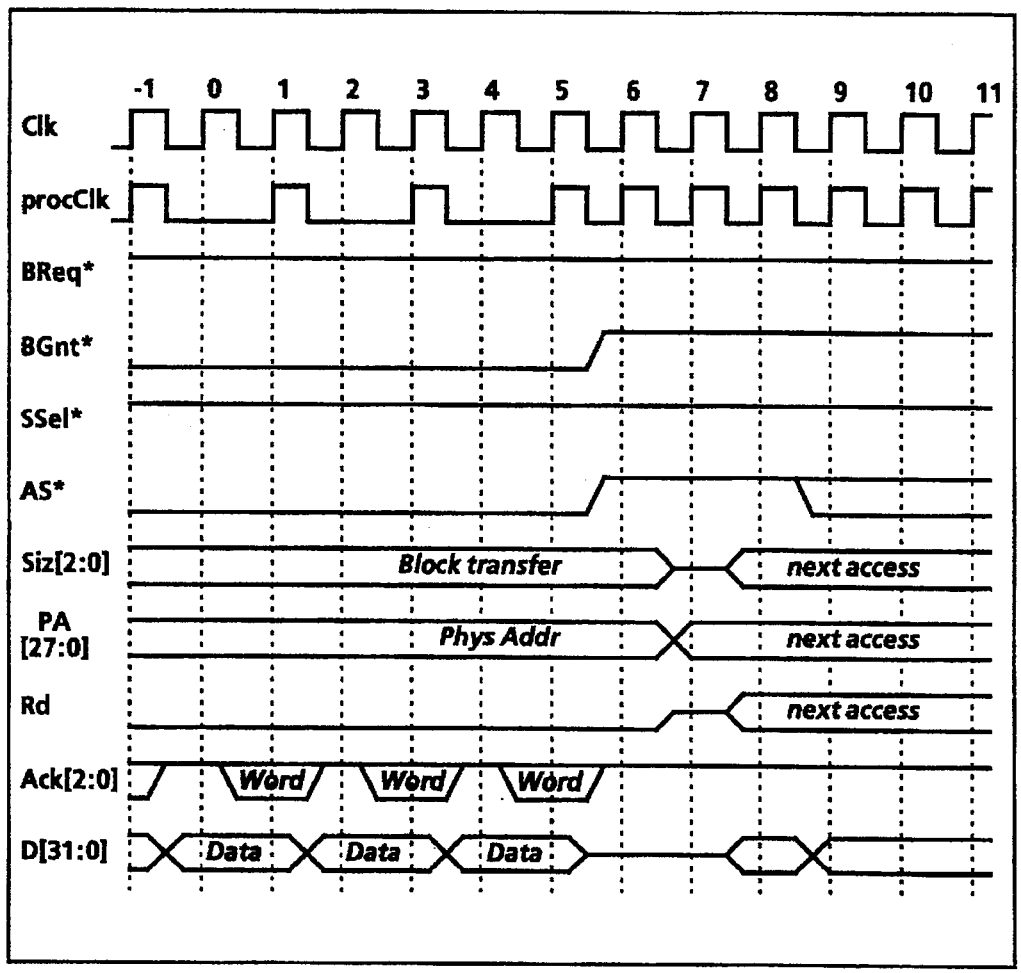
FIG. 24 is a timing diagram showing how the DVMA sequencer in FIG. 8 finishes responding to signals requesting a DMA operation writing multiple words.

FIGS. 23 and 24 show, respectively, the beginning and the end of a DMA operation writing multiple words to a slave in response to signals from register and decode 154. The first several cycles of FIG. 23, through Clk cycle 4, are the same as FIG. 18, except that the virtual address VA indicates which word in the block of words is to be transferred first.

Because a block transfer is indicated by Siz[2:0], the slave responds with a series of word signals on Ack[2:0] beginning in Clk cycle 5 in FIG. 23, each word signal indicating that a word of data has been received by the slave. In response to each word signal, DVMA sequencer 282 provides the next word of data on D[31:0]. The slave can provide word signals on Ack[2:0] on every cycle as shown in FIG. 23, on alternate Clk cycles as shown in FIG. 24, or at any other rhythm with other numbers of clock cycles between words as described above, until the multiple word transfer is complete, as shown in Clk cycle 5 in FIG. 24.

During each of Clk cycles 5–10 in FIG. 23 and Clk cycles –1, 1, and 3 in FIG. 24, but not during cycles 0, 2, and 4 in FIG. 24, DVMA sequencer 282 signals clock control logic 280 to provide a procClk pulse in each cycle, in response to which register and decode 154 executes a microinstruction. In executing these microinstructions, register and decode 154 provides signals to SBus register 196, registered transceiver 194, registered transceiver 122, and each processing unit's registered transceiver 212 so that words of data advance along the pipeline from the processing units toward SBus 102 During Clk cycles 0, 2, and 4 in FIG. 24, on the other hand, DVMA sequence, 282 signals clock control logic 280 to stop procClk. For example, register and decode 154 can execute a microinstruction in each Clk cycle and provide a source select signal to a different processing unit's registered transceiver 212 in each Clk cycle so that one word of data is received from each processing unit.

As a result, when the slave provides the final word signal on Ack[2:0] during Clk cycle 4 in FIG. 24, the SBus control circuitry responds to the word signal by pulling up the BGnt* and AS* lines, which is acceptable because DVMA sequencer 282 no longer needs SBus 102. DVMA sequencer 282 signals clock control logic 280 to restart procClk so that normal microinstruction execution resumes in Clk cycle 5.

Figure 25:
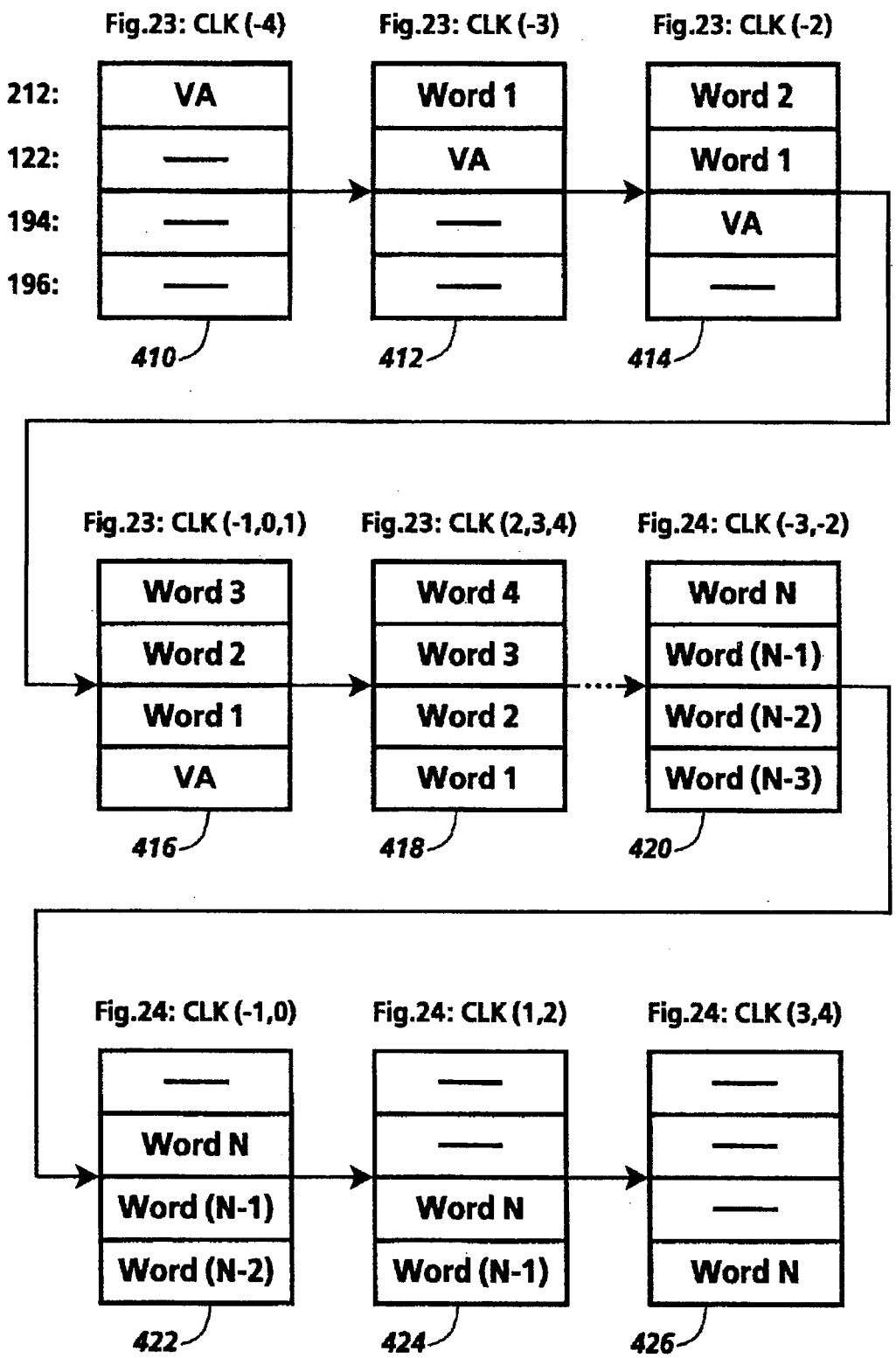
FIG. 25 schematic flow diagram showing movement of data through pipeline register circuitry during the operations in FIG. 23 and 24.

FIG. 25 shows a snapshot of a pipeline of registers at the end of each of several Clk cycles in FIGS. 23 and 24. Snapshots 410 and 412 are the same, respectively, as snapshots 350 and 352 in FIG. 19. Snapshot 414 shows the pipeline after Clk cycle –2 in FIG. 23, with virtual address VA in registered transceiver 194 and with the pipeline behind it being filled with word 1 and word 2. Snapshots 416 and 418 show the pipeline after Clk cycles –1 and 2, respectively, in FIG. 23, after which the pipeline is full of words of data in preparation for word signals from the slave on Ack[2:0].

When the slave provides word signals on Ack[2:0], on every Clk cycle as in FIG. 23 or on alternating Clk cycles as in FIG. 24, DVMA sequencer 282 can similarly provide a word of data to SBus 102 on every Clk cycle or on alternating Clk cycles, respectively. Snapshots 420, 422, 424, and 426 show the pipeline after Clk cycle −3, −1, 1, and 3, respectively, in FIG. 24, showing how word N reaches SBus register 196, from which it can be provided to SBus 102 to complete the multiple word write operation.

The microinstructions executed to perform the operations in FIGS. 15–25 can be loaded into control store 150 from host memory as described above in relation to FIG. 6. The host can be programmed to maintain a record of contents of control store 150, such as by starting point and length.

The implementation described above does not permit a microinstruction to test a condition. The microinstructions are executed as if there were no delays on the host bus, because DVMA sequencer 282 prevents execution of microinstructions whenever it is waiting for the host bus.

As suggested by the above examples, a typical sequence of microinstructions can begin by providing a virtual address in the pipeline. If a write operation is being performed, the sequence can also provide data to be written in the pipeline. Then bus control is requested. When bus control is received, the address is provided and, if a write operation, data is advanced in the pipeline. When the slave responds in a write operation, data is provided to the pipeline. In a read operation, data is stored from the pipeline as it is provided by the slave.

Closely related implementations are described in U.S. patent application Ser. No. 07/993,218, now issued as U.S. Pat. No. 5,450,603, entitled "SIMD Architecture with Bus for Transferring Data to and from Processing Units" ("the Common Bus application"), incorporated herein by reference. The Common Bus application describes transfers of data using a common bus connected to all the processing units. Additional features are described in the Subsampling/ Spreading application, the Rotation applications, the Tiling application, and the Arithmetic application.

F. Specific Applications

The invention could be applied in many ways, including image processing of the type described in U.S. Pat. Nos. 5,065,437; 5,048,109; 5,129,014; and 5,131,049. Such image processing techniques use data defining a first image to obtain a second image through operations such as erosion and dilation, operations that are defined in the Serra books cited above. Such operations can, for example, be performed by a series of suboperations each of which shifts an original image to obtain a shifted image and then performs a Boolean operation with values from the original image and the shifted image at each location. A coprocessor could perform such operations on image data obtained from host memory through DMA operations as described above.

The invention could also be applied to perform various other operations, such as pixel counting, gray scale morphology, skew detection, and Boolean operations on images.

The invention is particularly relevant to situations in which a large number of images are being handled or very large images are being handled. The ability to transfer images via the host bus is very important in such situation.

G. Miscellaneous

The invention has been described in relation to implementations in which a coprocessor communicates with other masters of a host bus through the coprocessor's control store. The invention might also be implemented with other communication techniques, such as through a region of host memory or through an interrupt line to a host processor.

The invention has been described in relation to an implementation in which a processing unit in a parallel processor can obtain an address to be provided on a host bus. The invention might be implemented with other techniques for obtaining addresses for the host bus, such as specialized address calculation circuitry.

The invention has been described in relation to an implementation with a SPARCStation as a host processor, but the invention could be implemented with any other suitable host processor. More specifically, the invention has been described in relation to a specific clocking scheme and pipelining circuitry appropriate to an SBus, but other clocking schemes and pipelining circuitry could be used as appropriate to other host buses. In addition to the burst transfers described above, concurrent burst transfers in both directions might be implemented with additional pipeline circuitry. Or it might be possible in some implementations for slave and master circuitry to share some components of pipeline circuitry.

The invention has been described in relation to an implementation in which items of data are transferred in and out of the processing units in horizontal format and operations are performed on items of data in horizontal format. Although this is not necessary and may not be advantageous, the invention might be implemented in a machine that includes corner turning circuitry so that operations can be performed in vertical format and items of data can be stored in vertical format in processing unit memory. Further, the invention might be implemented in a machine in which data can be shifted in and out of a processing unit array. Also, the invention might be implemented with additional circuitry for operating on data relating to an image as it is received from the host bus, such as by subsampling to reduce an image, thereby reducing the amount of data that must be stored in the processing units; this technique would be especially useful in operating on data relating to an image where the data in its original form is larger than the combined memory of the processing units. The invention might also be implemented with circuitry to reorder pixel values or bits within pixel values during a transfer from the host to the coprocessor or from the coprocessor to the host if the representation of data in the the host and coprocessor do not match each other.

The invention has been described in relation to implementations with conventional microprocessors, but the invention might also be implemented with reduced instruction set (RISC) chips.

The invention has been described in relation to implementations in which processing units are connected into a one-dimensional array. The invention might also be implemented with a parallel processor in which the processing units are connected into a two- or three-dimensional array or into any other suitable arrangement.

The invention has been described in relation to implementations in which bits remain uninverted while being transferred between components in a parallel processor. The invention might also be implemented with inversions during data transfer to increase performance, such as an inversion when an item of data is loaded into a holding register and another inversion when the item of data is read out of the holding register.

The invention has been described in relation to an implementation that includes a SIMD parallel processor in which coprocessor control circuitry has two control lines to each processing unit, one to select a register as a source of data on a common bus and the other to write enable the processing unit's memory. The invention might be implemented with other types of parallel processors. For example, the invention could be implemented with additional lines to each processing unit, such as separate instruction and address lines so that each processing unit could operate independently of other processing units. In addition, special write enable lines could be provided to write independently in the memories of different processing units or independently in the memory of a specific microprocessor in each processing unit.

The invention has been described in relation to implementations in which control circuitry provides addresses in parallel to processing units. The invention might also be implemented with a parallel processor in which processing units independently obtain addresses, such as from a local address processor or from an address processor that serves a subset of processing units.

The invention has been described in relation to implementations in which processing units include single port memory circuitry. The invention might also be implemented with dual port memory circuitry.

The invention has been described in relation to implementations in which a 32 bit bus interconnects 32 bit registers and in which each processing unit includes two 16 bit microprocessors and a 32 bit SRAM. The invention might also be implemented in numerous other ways with components having different widths. For example, each processing unit might include a 16 bit SRAM for each microprocessor or each processing unit might include a single 32 bit microprocessor. Alternatively, the bus might be a 16 bit or 64 bit bus, and other components could be chosen accordingly. Similarly, the control store, described as implemented with 128 bit microinstructions, might also be implemented with microinstructions of other lengths, such as 64 bit encoded microinstructions. Further the invention might be implemented with a dedicated control store chip.

The invention has been described in relation to implementations that operate on data relating to images, but might also be implemented to operate on data that do not relate to an image.

The invention has been described in relation to implementations that include readily available discrete components. The invention might also be implemented with custom VLSI components, and similarly with custom memory components.

The invention has been described in relation to implementations in which each processing unit includes SRAM, but the invention might also be implemented with other types of memory, such as dynamic RAM, flash RAM, and so forth.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a coprocessor that includes:
host bus connecting circuitry for electrically connecting the coprocessor to a host bus of a host processor; the host bus connecting circuitry comprising:
slave circuitry connected for receiving slave request signals from the host bus; and
master circuitry connected for providing signals requesting host bus operations to the host bus, and for transferring data from the coprocessor to the host bus or from the host bus to the coprocessor;
processing circuitry comprising:
two or more processing units; each processing unit responding to instructions by performing operations;
coprocessor control circuitry connected for controlling the processing units by providing control signals and for controlling the master circuitry by providing transfer signals; the control signals including processing unit instructions; the coprocessor control circuitry comprising:
control store circuitry for storing data; the data stored in the control store circuitry including control store instructions;
a control store sequencer connected for accessing control store instructions stored in the control store circuitry; and
signal providing circuitry connected for using the accessed control store instructions to provide the control signals and the transfer signals;
control signal circuitry connected for receiving the control signals from the coprocessor control circuitry and for providing the control signals to the processing units; and
transfer signal circuitry connected for receiving transfer signals from the coprocessor control circuitry and for providing the transfer signals to the master circuitry; and
synchronizing circuitry connected for receiving master request signals from the master circuitry;
the method comprising acts of:
providing coprocessor request signals to the slave circuitry from the host bus, the coprocessor request signals requesting a coprocessor operation;
operating the slave circuitry to respond to the coprocessor request signals by providing signals to the coprocessor control circuitry;
in response to the signals from the slave circuitry, operating the control store sequencer to access a sequence of the control store instructions stored in the control store circuitry and operating the signal providing circuitry to respond to the accessed sequence of control store instructions by providing a set of control signals and a sequence of transfer signals; the set of control signals including a sequence of processing unit instructions;
operating the control signal circuitry to provide the sequence of processing unit instructions to all of the processing units in parallel and operating the transfer signal circuitry to provide the sequence of transfer signals to the master circuitry;
in response to the sequence of transfer signals, operating the master circuitry to provide signals requesting host bus operations to the host bus, to transfer data from a processing unit to the host bus or from the host bus to a set of one or more processing units , and to provide a sequence of master request signals to the synchronizing circuitry;
in response to the sequence of processing unit instructions, operating all of the processing units to perform operations in parallel while the master circuitry transfers data from a processing unit to the host bus or from the host bus to a set of one or more processing units so that the coprocessor thereby performs the coprocessor operations requested by the coprocessor request signals;

in response to the sequence of master request signals, operating the synchronizing circuitry to control execution of processing unit instructions by the processing units so that a transfer of data from a processing unit to the host bus or from the host bus to a set of one or more processing units is performed by synchronized operations of the processing units and the master circuitry.

2. The method of claim 1 in which the coprocessor control circuitry includes a status register for storing data; the coprocessor control circuitry using data stored in the status register in controlling the coprocessor; the act of operating the slave circuitry to respond to the coprocessor request signals comprising operating the slave circuitry to provide signals that change data stored in the status register.

3. The method of claim 1 in which the coprocessor control circuitry comprises a status register for storing data; the coprocessor control circuitry using data stored in the status register in controlling the coprocessor; the act of operating the slave circuitry to respond to the coprocessor request signals comprising operating the slave circuitry to transfer data from the status register to the host bus.

4. The method of claim 1 in which the slave circuitry is further connected for transferring items of data from the host bus to the control store circuitry; the act of operating the slave circuitry to respond to the coprocessor request signals comprising operating the slave circuitry to transfer a data item sequence including at least one item of data from the host bus to the control store circuitry.

5. The method of claim 1 in which the data item sequence includes encoded instruction items that are included in the sequence of the control store instructions; the signal providing circuitry further including decode circuitry for decoding encoded instruction items to obtain decoded items of instruction data indicating processing unit instructions, the decode circuitry being connected for providing the decoded items of instruction data to the control signal circuitry; the act of operating the signal providing circuitry comprising:

operating the decode circuitry to decode an encoded instruction item to obtain a decoded item of instruction data indicating a processing unit instruction; and providing the decoded item of instruction data to the control signal circuitry.

6. The method of claim 1 in which the data item sequence includes encoded master items that are included in the sequence of the control store instructions; the signal providing circuitry further comprising decode circuitry for decoding encoded master items to obtain decoded transfer signals; the decode circuitry being connected for providing the decoded transfer signals to the master circuitry; the act of operating the signal providing circuitry comprising:

operating the decode circuitry to decode a series of encoded master items to obtain a series of decoded transfer signals indicating the sequence of transfer signals; and providing the series of decoded transfer signals to the transfer signal circuitry.

7. The method of claim 6 in which the series of decoded transfer signals indicates a request to transfer an item of data from one of the processing units to the control store circuitry; the act of operating the master circuitry comprising:

transferring the item of data from one of the processing units to the host bus; and providing slave request signals to the slave circuitry through the host bus, the slave request signals requesting transfer of the item of data from the host bus to the control store circuitry.

8. The method of claim 6 in which the slave circuitry is further connected for transferring data from the control store circuitry to the host bus; the series of decoded transfer signals indicating a request to transfer an item of data from the control store circuitry to a set of the processing units; the act of operating the master circuitry comprising:

providing slave request signals to the slave circuitry through the host bus, the slave request signals requesting an operation in which the slave circuitry transfers the item of data from the control store circuitry to the host bus; and transferring the item of data from the host bus to the set of processing units.

9. The method of claim 1 in which the master circuitry is connected for receiving items of data from any of the processing units; the acts of operating the signal providing circuitry comprising:

providing the set of control signals and the sequence of transfer signals so that the master circuitry receives an item of data from one of the processing units;

the act of operating the master circuitry comprising:

operating the master circuitry to provide the item of data received from one of the processing units to the host bus.

10. The method of claim 1 in which the master circuitry is connected for providing items of data to any of the processing units; the act of operating the master circuitry comprising:

operating the master circuitry to receive an item of data from the host bus;

the method further comprising an act of operating the signal providing circuitry to provide the set of control signals and the sequence of transfer signals so that the master circuitry provides the item of data received from the host bus to a set of one or more of the processing units.

11. The method of claim 1 in which the master circuitry is connected for receiving items of data from any of the processing units, the act of operating the master circuitry comprising:

transferring a series of two or more items of data including a first item of data and one or more following items of data after the first item of data;

the method further comprising an act of operating the signal providing circuitry to provide the set of control signals and the sequence of transfer signals so that the master circuitry can provide the first item of data to the host bus;

the act of operating the master circuitry further comprising:

operating the master circuitry to provide one request for host bus control; and when the master circuitry receives host bus control, operating the master circuitry to provide the first item of data to the host bus;

the method further comprising, for each following item of data after the first item of data, an act of operating the signal providing circuitry to provide the set of control signals and the sequence of transfer signals so that the master circuitry provides the following item of data to the host bus.

12. The method of claim 11, further comprising an act of operating the signal providing circuitry to provide the set of control signals and the sequence of transfer signals so that each of a set of two or more of the processing units provides one of the series of two or more items of data.

13. The method of claim 1 in which the master circuitry is connected for providing items of data to any of the processing units, the act of operating the master circuitry comprising:

transferring a series of two or more items of data including a first item of data and one or more following items of data after the first item of data;

the act of transferring a series of two or more items of data comprising:

operating the master circuitry to provide one request for host bus control;

when the master circuitry receives host bus control, operating the master circuitry to receive the first item of data from the host bus; and for each following item of data after the first item of data, operating the signal providing circuitry to provide the set of control signals and the sequence of transfer signals so that the master circuitry receives the following item of data from the host bus.

14. The method of claim 13, further comprising an act of operating the signal providing circuitry to provide the set of control signals and the sequence of transfer signals so that each of a set of two or more of the processing units receives one of the series of two or more items of data.

15. A coprocessor that can be connected to a host bus of a host processor, the coprocessor comprising:

host bus connecting circuitry for electrically connecting the coprocessor to the host bus; the host bus connecting circuitry comprising:

slave circuitry connected for receiving slave request signals from the host bus; and master circuitry connected for providing signals requesting host bus operations to the host bus, and for transferring data from the coprocessor to the host bus or from the host bus to the coprocessor;

processing circuitry comprising:

two or more processing units; each processing unit responding to control signals by performing operations;

coprocessor control circuitry for controlling the processing units by providing control signals and for controlling the master circuitry by providing transfer signals; the control signals including processing unit instructions; the coprocessor control circuitry comprising:

control store circuitry for storing data; the data stored in the control store circuitry including control store instructions;

a control store sequencer that accesses control store instructions stored in the control store circuitry;

signal providing circuitry that, when control store instructions are accessed by the control store sequencer, uses the accessed control store instructions to provide signals; the signals provided by the signal providing circuitry including the control signals and the transfer signals;

control signal circuitry connected for receiving the control signals from the coprocessor control circuitry and for providing the control signals to the processing units; the control signal circuitry providing the processing unit instructions to the processing circuitry of all of the processing units in parallel; and transfer signal circuitry connected for receiving transfer signals from the coprocessor control circuitry and for providing the transfer signals to the master circuitry; and synchronizing circuitry for receiving master request signals from the master circuitry and for controlling execution of processing unit instructions by the processing units in response to the master request signals;

the slave circuitry further being connected for storing data in the control store circuitry; the slave circuitry responding to a sequence of the slave request signals by storing a sequence of the control store instructions in the control store circuitry and by providing signals to the coprocessor control circuitry to cause the control store sequencer to access the sequence of the control store instructions stored in the control store; the signal providing circuitry responding to the accessed sequence of control store instructions by providing a set of control signals and a sequence of transfer signals; the set of control signals including a sequence of processing unit instructions; and the master circuitry receiving the sequence of transfer signals from the transfer signal circuitry and, in response, providing signals requesting host bus operations to the host bus and transferring data from the coprocessor to the host bus or from the host bus to the coprocessor;

all of the processing units performing operations in parallel in response to the sequence of processing unit instructions while the master circuitry transfers data from a processing unit to the host bus or from the host bus to a set of one or more processing units so that the coprocessor thereby performs the coprocessor operations requested by the slave request signals;

the master circuitry further responding to the sequence of transfer signals by providing a sequence of master request signals to the synchronizing circuitry; the synchronizing circuitry responding to the sequence of master request signals by controlling execution of processing unit instructions by the processing units so that a transfer of data from a processing unit to the host bus or from the host bus to a set of one or more processing units is performed by synchronized operations of the processing units and the master circuitry.

16. The coprocessor of claim 15 in which the slave circuitry is connected for transferring items of data from the host bus to the control store circuitry.

17. The coprocessor of claim 15 in which each processing unit responds to processing unit instructions by performing operations on items of data.

18. A coprocessor that can be connected to a host bus of a host processor, the coprocessor comprising:

host bus connecting circuitry for electrically connecting the coprocessor to the host bus; the host bus connecting circuitry comprising:

slave circuitry connected for receiving slave request signals from the host bus; and master circuitry connected for providing master request signals requesting host bus operations to the host bus, and for transferring data from the coprocessor to the host bus or from the host bus to the coprocessor;

processing circuitry comprising:

two or more processing units; each processing unit comprising processing circuitry for responding to processing unit instructions by performing operations;

coprocessor control circuitry for controlling the processing units by providing control signals and for controlling the master circuitry by providing transfer signals; the control signals including processing unit instructions; the coprocessor control circuitry comprising:

a control store for storing control store instructions;

a control store sequencer that accesses control store instructions stored in the control store; and signal providing circuitry that, when control store instructions are accessed by the control store sequencer, uses the accessed control store instructions to provide signals; the signals provided by the signal providing circuitry including the control signals and the transfer signals;

control signal circuitry connected for receiving the control signals from the coprocessor control circuitry and for providing the control signals to the processing units; the control signal circuitry providing the processing unit instructions to the processing circuitry of all of the processing units in parallel; and transfer signal circuitry connected for receiving transfer signals from the coprocessor control circuitry and for providing the transfer signals to the master circuitry; and synchronizing circuitry for receiving master request signals from the master circuitry and for controlling execution of processing unit instructions by the processing units in response to the master request signals;

the slave circuitry receiving slave request signals requesting coprocessor operations from the host bus and, in response, providing signals to the coprocessor control circuitry to cause the control store sequencer to access a sequence of the control store instructions stored in the control store; the signal providing circuitry responding to the accessed sequence of control store instructions by providing a set of control signals and a sequence of transfer signals; the set of control signals including a sequence of processing unit instructions requesting processing unit operations; the sequence of transfer signals requesting data transfer operations;

the master circuitry receiving the sequence of transfer signals from the transfer signal circuitry and, in response, providing signals requesting host bus operations to the host bus and transferring data from the coprocessor to the host bus or from the host bus to the coprocessor to perform requested data transfer operations;

the processing circuitry of all of the processing units performing operations in parallel in response to the sequence of processing unit instructions while the master circuitry transfers data from a processing unit to the host bus or from the host bus to a set of one or more processing units so that the coprocessor thereby performs the coprocessor operations requested by the slave request signals;

the master circuitry further responding to the sequence of transfer signals by providing a sequence of master request signals to the synchronizing circuitry; the synchronizing circuitry responding to the sequence of master request signals by controlling execution of processing unit instructions by the processing units so that a transfer of data from a processing unit to the host bus or from the host bus to a set of one or more processing units is performed by synchronized operations of the processing units and the master circuitry.

19. The coprocessor of claim 18 in which the master circuitry comprises a common bus connected to all of the processing units.

20. The coprocessor of claim 19 in which the master circuitry further comprises, for each processing unit, a respective register for receiving data from the common bus for the processing unit and for providing data from the processing unit to the common bus.

21. The coprocessor of claim 19 in which the coprocessor control circuitry further responds to the signals from the slave circuitry by providing source select signals; the control signal circuitry providing the source select signals to the respective registers of the processing units, each source select signal indicating one of the processing units as a source of data to be provided to the common bus.

22. The coprocessor of claim 19 in which the coprocessor control circuitry further responds to the signals from the slave circuitry by providing destination select signals; the control signal circuitry providing the destination select signals to the processing units, each destination select signal indicating a set of one or more processing units as destinations to receive data from the respective registers.

23. The coprocessor of claim 22 in which each processing unit comprises respective memory circuitry; each destination select signal including a write enable signal that enables the memory circuitry of each processing unit in the set so that data can be written in the memory circuitry from the respective register.

24. The coprocessor of claim 19 in which the master circuitry further comprises pipeline register circuitry connected between the host bus and the common bus for storing an item of data being transferred between the host bus and the common bus.

25. The coprocessor of claim 18 in which each processing unit comprises:

respective processing circuitry comprising two or more of internal registers; and respective memory circuitry connected for receiving items of data transferred from the host bus to the processing unit; the memory circuitry of each processing unit being able to store more items of data than the processing unit's internal registers.

26. The coprocessor of claim 18 in which each processing unit comprises respective processing circuitry capable of performing operations in horizontal format on an item of data received from the host bus in horizontal format.

27. The coprocessor of claim 26 in which the host bus provides items of data that include N bits in horizontal format, where N is an even integer; the processing circuitry of each processing unit comprising two microprocessors, each capable of performing operations in horizontal format on items of data that include N/2 bits.

28. The coprocessor of claim 18 in which the coprocessor control circuitry comprises a status register for storing data; the coprocessor control circuitry using data stored in the status register in controlling the coprocessor; the slave circuitry further being connected for providing signals that change data stored in the status register.

29. The coprocessor of claim 18 in which the coprocessor control circuitry comprises a status register for storing data; the coprocessor control circuitry using data stored in the status register in controlling the coprocessor; the slave circuitry further being connected for transferring data from the status register to the host bus.

30. The coprocessor of claim 18 in which the sequence of the control store instructions in the control store includes encoded instruction items; the signal providing circuitry comprising decode circuitry for decoding the encoded instruction items to obtain decoded items of instruction data indicating the sequence of processing unit instructions.

31. The coprocessor of claim 18 in which the sequence of the control store instructions in the control store includes encoded master items; the signal providing circuitry comprising decode circuitry for decoding the encoded master items to obtain decoded transfer signals indicating the sequence of transfer signals.

32. The coprocessor of claim 31 in which the decoded transfer signals include a store request signal requesting transfer of an item of data to the control store circuitry; the master circuitry responding to the store request signal by transferring the item of data to the host bus and by providing slave request signals to the slave circuitry through the host bus, the slave request signals requesting transfer of the item of data from the host bus to the control store circuitry.

33. The coprocessor of claim 31 in which the slave circuitry is further connected for transferring data from the control store circuitry to the host bus; the decoded transfer signals including a retrieve request signal requesting transfer of an item of data from the control store to the master circuitry; the master circuitry responding to the retrieve request signal by providing slave request signals to the slave circuitry through the host bus, the slave request signals requesting an operation in which the slave circuitry transfers the item of data from the control store circuitry to the host bus; the master circuitry further responding to the retrieve request signal by receiving the item of data from the host bus.

34. The coprocessor of claim 18 in which the host processor can transfer blocks of data using the host bus, each block including a number of data items; each processing unit comprising respective memory circuitry connected for receiving items of data transferred to the processing unit; the memory circuitry of all the processing units together being able to store two or more blocks of data, each including the number of data items; the transfer signals from the coprocessor control circuitry including signals requesting a sequence of data transfer operations for evenly distributing data items in a block of data among the processing units.

35. The coprocessor of claim 34 in which the sequence of data transfer operations transfers, to each of the processing units, a respective one of the data items in the block of data.

36. The coprocessor of claim 18 in which the synchronizing circuitry comprises clock control circuitry for controlling when clock signals from the host bus are provided to the coprocessor control circuitry; the master request signals including stop signals that are provided to the clock control circuitry to request that the clock control circuitry stop permitting host bus clock signals to be provided to the coprocessor control circuitry;

the coprocessor control circuitry providing the control signals and the transfer signals only when the clock control circuitry permits host bus clock signals to be provided to the coprocessor control circuitry;

the clock control circuitry responding to the stop signals from the master circuitry by stopping host bus clock signals from being provided to the coprocessor control circuitry; and the master circuitry providing a stop signal to the clock control circuitry while waiting for the host bus so that the clock control circuitry stops host bus clock signals from being provided to the coprocessor control circuitry and the coprocessor control circuitry therefore stops providing control signals and transfer signals.

37. The coprocessor of claim 36 in which the slave circuitry further receives instruction storing signals indicating requests to store control store instructions in the control store and, in response, stores the control store instructions in the control store;

the clock control circuitry further being connected for receiving stop signals from the slave circuitry; the clock control circuitry responding to the stop signals from the slave circuitry by stopping host bus clock signals from being provided to the coprocessor control circuitry; and the slave circuitry providing a stop signal to the clock control circuitry while storing control store instructions in the control store so that the clock control circuitry stops host bus clock signals from being provided to the coprocessor control circuitry and the coprocessor control circuitry therefore stops providing control signals and transfer signals.

38. The coprocessor of claim 18 in which each processing unit further comprises memory;

each processing unit's processing circuitry and memory being connected so that only one of the processing unit's processing circuitry and memory can provide data for transfer to the host bus by the master circuitry; and the control signals including signals indicating which one of a processing unit's processing circuitry and memory provides data for transfer to the host bus by the master circuitry.

39. The coprocessor of claim 18 in which the sequence of transfer signals includes a first transfer signal requesting an operation that writes or reads data to or from the host bus; the master circuitry responding to the first transfer signal by:

providing a first master request signal to the synchronizing circuitry; and requesting control of the host bus;

the synchronizing circuitry responding to the first master request signal by stopping execution of processing unit instructions by the processing units.

40. The coprocessor of claim 39 in which the synchronizing circuitry further controls accessing of control store instructions by the control store sequencer; the master circuitry further comprising: pipeline circuitry connected between the host bus and the processing units for transferring data from the processing units to the host bus or from the host bus to the processing units;

the signal providing circuitry further providing pipeline signals to control operation of the pipeline circuitry;

after receiving control of the host bus, the master circuitry providing a second master request signal to the synchronizing circuitry; the synchronizing circuitry responding to the second master request signal by permitting access of a control store instruction by the control store sequencer; the signal providing circuitry using the accessed control store instruction to provide a preparatory pipeline signal to the pipeline circuitry to prepare the pipeline circuitry to perform the requested data transfer operation.

41. The coprocessor of claim 40 in which the requested operation reads data from the host bus; the preparatory pipeline signal preparing the pipeline circuitry to receive data from the host bus.

42. The coprocessor of claim 41 in which the master circuitry responds to a slave signal indicating that data has been provided on the host bus by providing a third master request signal to the synchronizing circuitry; the synchronizing circuitry responding to the third master request signal by permitting access of a sequence of control store instructions by the control store sequencer; the signal providing circuitry using the accessed sequence of control store instructions to provide pipeline signals and control signals to transfer the data to the processing units.

43. The coprocessor of claim 40 in which the requested operation writes data to the host bus; the preparatory pipeline signal preparing the pipeline circuitry to provide data to the host bus.

44. The coprocessor of claim 40 in which the requested data transfer operation is a multiple word transfer and the pipeline circuitry can hold a sequence of words of data; for each word of the transfer, the master circuitry providing a word advance master request signal to the synchronizing circuitry; the synchronizing circuitry responding to each word advance master request signal by advancing the sequence of words in the pipeline.

45. A coprocessor that can be connected to a host bus of a host processor, the coprocessor comprising:

host bus connecting circuitry for electrically connecting the coprocessor to the host bus; the host bus connecting circuitry comprising:
  slave circuitry connected for receiving slave request signals from the host bus; and
  master circuitry connected for providing master request signals requesting host bus operations to the host bus, and for transferring data from the coprocessor to the host bus or from the host bus to the coprocessor; and processing circuitry comprising:
  two or more processing units; each processing unit comprising processing circuitry for responding to processing unit instructions by performing operations;
  coprocessor control circuitry for controlling the processing units by providing control signals and for controlling the master circuitry by providing transfer signals; the control signals including processing unit instructions; the coprocessor control circuitry comprising:
    a control store for storing control store instructions;
    a control store sequencer that accesses control store instructions stored in the control store; and
    signal providing circuitry that, when control store instructions are accessed by the control store sequencer, uses the accessed control store instructions to provide signals; the signals provided by the signal providing circuitry including the control signals and the transfer signals;
  control signal circuitry connected for receiving the control signals from the coprocessor control circuitry and for providing the control signals to the processing units; the control signal circuitry providing the processing unit instructions to the processing circuitry of all of the processing units in parallel; and
  transfer signal circuitry connected for receiving transfer signals from the coprocessor control circuitry and for providing the transfer signals to the master circuitry;

the master circuitry further comprising pipeline circuitry connected between the host bus and the processing units for transferring data from the processing units to the host bus or from the host bus to the processing units;

the signal providing circuitry further providing pipeline signals to control operation of the pipeline circuitry;

the slave circuitry receiving slave request signals requesting coprocessor operations from the host bus and, in response, providing signals to the coprocessor control circuitry to cause the control store sequencer to access a sequence of the control store instructions stored in the control store; the signal providing circuitry responding to the accessed sequence of control store instructions by providing a set of control signals and a sequence of transfer signals; the set of control signals including a sequence of processing unit instructions requesting processing unit operations; the sequence of transfer signals requesting data transfer operations;

the master circuitry receiving the sequence of transfer signals from the transfer signal circuitry and, in response, providing signals requesting host bus operations to the host bus and transferring data via the pipeline circuitry from the coprocessor to the host bus or from the host bus to the coprocessor to perform requested data transfer operations;

the processing circuitry of all of the processing units performing operations in parallel in response to the sequence of processing unit instructions while the master circuitry transfers data from a processing unit to the host bus or from the host bus to a set of one or more processing units so that the coprocessor thereby performs the coprocessor operations requested by the slave request signals;

the master circuitry further responding to the sequence of transfer signals by requesting control of the host bus; after receiving control of the host bus, the master circuitry providing signals so that the control store sequencer accesses a control store instruction; the signal providing circuitry using the accessed control store instruction to provide a preparatory pipeline signal to the pipeline circuitry to prepare the pipeline circuitry so that the master circuitry can perform the requested data transfer operation via the pipeline circuitry.

\* \* \* \* \*